United States Patent
Inoue et al.

(10) Patent No.: US 7,663,759 B2
(45) Date of Patent: Feb. 16, 2010

(54) DISPLACEMENT SENSOR

(75) Inventors: Tokiko Inoue, Fukuchiyama (JP);
Yusuke Iida, Ayabe (JP); Tatsuya Matsunaga, Fukuchiyama (JP); Hitoshi Oba, Fukuchiyama (JP)

(73) Assignee: Omron Corporation, Kyoto-Shi (JP)

( * ) Notice: Subject to any disclaimer, the term of this patent is extended or adjusted under 35 U.S.C. 154(b) by 390 days.

(21) Appl. No.: 11/776,255

(22) Filed: Jul. 11, 2007

(65) Prior Publication Data
US 2008/0013103 A1 Jan. 17, 2008

(30) Foreign Application Priority Data
Jul. 12, 2006 (JP) ............... 2006-192208

(51) Int. Cl.
*G01N 21/55* (2006.01)
(52) U.S. Cl. .................. 356/445; 356/448; 356/625
(58) Field of Classification Search .................. None
See application file for complete search history.

(56) References Cited

U.S. PATENT DOCUMENTS 5,864,394 A * 1/1999 Jordan et al. ............. 356/237.2
6,175,417 B1 * 1/2001 Do et al. ..................... 356/392
7,142,708 B2 * 11/2006 Sakai et al. ................. 356/394

FOREIGN PATENT DOCUMENTS

| JP | 09-273923 | 10/1997 |
| JP | 2001-343224 | 12/2001 |
| JP | 2002-286422 | 10/2002 |
| JP | 2003-109027 | 4/2003 |

* cited by examiner

*Primary Examiner*—Gregory J Toatley, Jr.
*Assistant Examiner*—Juan D Valentin
(74) *Attorney, Agent, or Firm*—Foley & Lardner LLP

(57) ABSTRACT

An image taken by an imaging device is displayed on a display unit. When a confirmation instruction is inputted through an input unit, image teaching is performed while the image displayed on the display unit is set to a setting object image. A measurement item which is of a candidate of a measurement process including specification of a reference position is displayed as the measurement process to accept selection. Specification of cutout area which constitutes one measurement target region is accepted, a measurement point including a local region or a feature point which is used for the measurement is automatically set in the measurement target region based on pieces of information on the set measurement process and reference position.

13 Claims, 22 Drawing Sheets

RELATIONSHIP BETWEEN OBJECT HAVING GROOVE AND SENSOR HEAD UNIT

LINE BEAM EMERGING ON OBJECT SURFACE

LINE BEAM IMAGE ON LIGHT ACCEPTANCE SURFACE OF IMAGING DEVICE

HEIGHT

MEASUREMENT OBJECT
PORTION SPECIFICATION
RANGE UPPER LEFT (x1, y1)
LOWER RIGHT (x2, y2)

(d)

(a)  (e)

MEASUREMENT START LINE: x1
MEASUREMENT END LINE: x2
FEATURE POINT: AVERAGE (b)  (f)

MEASUREMENT START LINE: x1
MEASUREMENT END LINE: x2
FEATURE POINT: PEAK (c)  (g)

MEASUREMENT START LINE: x1
MEASUREMENT END LINE: x2
FEATURE POINT: BOTTOM

TWO-POINT STEP | POINT 2 RESULT − POINT 1 RESULT (1) IN THE CASE WHERE PROJECTED STEP (+) IS MEASURED BASED ON BOTTOM SURFACE (a)　　　　　　　(c)　　　　　　　(d)

(b)　　　　　　　(e)　　　　　　　(f)

(2) IN THE CASE WHERE RECESSED STEP (−) IS MEASURED BASED ON UPPER SURFACE (a)　　　　　　　(c)　　　　　　　(d)

(b)　　　　　　　(e)　　　　　　　(f)

| THREE-POINT STEP | POINT 3 RESULT− (POINT 1 RESULT + POINT 2 RESULT)/2 |

(1) IN THE CASE WHERE PROJECTED STEP (+) IS MEASURED BASED ON BOTTOM SURFACE (a)

(c)

(d)

(b)

(2) IN THE CASE WHERE RECESSED STEP (−) IS MEASURED BASED ON UPPER SURFACE (a)

(c)

(d)

(b)

| EDGE WIDTH | POINT 2 RESULT – POINT 1 RESULT |

(a)

(b)

P1 AND P2 COMMON (c)

(d)

(e)

P1 AND P2 COMMON (f)

DISPLACEMENT SENSOR

This application claims priority from Japanese patent application JP2006-192208, filed on Jul. 12, 2006. The entire content of the aforementioned application is incorporated herein by reference.

BACKGROUND OF THE INVENTION

1. Field of the Invention

The present invention relates to a displacement sensor which utilizes an optical cutting method to measure a displacement of an object.

2. Description of the Related Art

Conventionally, there are known sensor devices for measuring the displacement, a length, and an angle of various measurement objects. For example, a conventional displacement sensor includes a floodlighting unit, a light acceptance unit, calculation means, and output means. The floodlighting unit irradiates a measurement object with a line beam by driving a floodlighting element such as a laser diode. The light acceptance unit accepts slit light which is reflected by the measurement object after emitted from the floodlighting unit. The calculation means calculates a distance to the measurement object. The output means outputs the distance to the measurement object, which is calculated by the calculation means (refer to, for example, Japanese Patent No. 3599239).

The conventional displacement sensor can measure a sectional outline shape irradiated with the line beam on the measurement object. The use of the conventional displacement sensor can check whether or not a product falls within a specification range in a production line. Generally, in the case of a product inspection, a determination is seldom made by comparing a whole shape of a product to be inspected to that of a good product from the viewpoints of hardware necessary for processing and a processing time. However, the inspection is performed by measurements of a position and a height of a point which becomes important in the shape and a distance between the points. For example, in the case where the height and depth of a step are measured, a user separately sets an area including a step surface used in calculating the step from the sectional outline shape by a user. Which height and depth are measured from a reference position in the sectional outline shape is set by the area even in a top and bottom measurement instead of the step. In the case of the measurement of a step edge position on the measurement object, the area including the step edge position is set to perform the measurement.

However, in the conventional displacement sensor, a place which the user measures is specified and set in each time when a measurement process is performed based on plural local regions or feature points. Therefore, a setting operation is obscure and setting work is troublesome.

SUMMARY OF THE INVENTION

In view of the foregoing, an object of the invention is to provide a displacement sensor in which the setting for the desired measurement can be performed with the simple operation.

Other objects and advantages of the invention will become clear to those skilled in the art upon making reference to the detailed description.

A displacement sensor according to an aspect of the invention includes a floodlighting unit which illuminates a measurement object with a line beam; an imaging unit which takes an image from a view angle at which a position of a line beam image is viewed while changed according to a height of a surface of the measurement object illuminated with the line beam; a processing unit which obtains a height distribution in relation to a direction along the line beam on the surface of the measurement object based on the taken image including the line beam image obtained from the imaging unit, performs a measurement process previously set based on plural local regions or feature points on the obtained height distribution in relation to the direction along the line beam, performs a setting process for setting contents of the measurement process; a display unit which displays the taken image and a screen for the setting; an input unit which receives an input for performing the setting; and an output unit which outputs a result of the measurement process, wherein, in the setting process, the processing unit displays the taken image on the display unit, and sets the taken image as a setting object image, the taken image being displayed on the display unit when a confirmation instruction is inputted through the input unit, in the measurement process for the setting object image, simultaneously displays an option in which measurement is performed based on as a reference line or a reference point, a line or a point relatively located in an upper portion of the line beam image included in the setting object image and an option in which measurement is performed based on, as a reference line or a reference point, a line or a point relatively located in a lower portion of the line beam image, or simultaneously displays an option in which measurement is performed based on, as a reference line or a reference point, a line or a point relatively located on a left side of the line beam image included in the setting object image or an option in which measurement is performed based on, as a reference line or a reference point, a line or a point relatively located on a right side of the line beam image, receives an selection of the option input through the input unit, and sets a kind of the measurement process to be set while the reference line or reference point for the measurement process is distinguished from others, sets one measurement process target region in the setting object image, the one measurement process target region becoming a target of the measurement process, and automatically sets a local region or a feature point according to a relative positional relationship between the line beam image and the set reference line or reference point, the local region or feature point being necessary to perform the set measurement process to the line beam image included in the one measurement process target region.

At this point, the measurement process previously set based on the plural local regions or feature points includes a calculation process between the plural local regions or feature points and a extraction process of a predetermined local region or feature point from the plural local regions or feature points. The feature point includes an uppermost point (peak point), a lowermost point (bottom point), an average point, a center point, and a representative point of the edge.

The line or point which becomes the reference located relatively above includes a horizontal line indicating the upper stage of the projected step, an average point and a center point of the horizontal line, an uppermost point of the upper stage, a horizontal line indicating the upper stage of the recessed step, an average point, a center point, and an uppermost point of the horizontal line, and uppermost points of the right and left horizontal lines. The line or point which becomes the reference located relatively below includes the horizontal line indicating the upper stage of the projected step, the average point, center point, and lowermost point of the horizontal line, the lowermost points of the right and left horizontal lines, the horizontal line of the lower stage which is of a recess of the recessed step, and the average point, center point, and lowermost point of the horizontal line.

In the displacement sensor according to the aspect of the invention, preferably the processing unit displays the setting object image on the display unit in the process of setting the measurement process target region, the processing unit displays a candidate region of the measurement process target region while the candidate region is overlapped with the setting object image, receives an instruction to change a position, a shape, and a size of the candidate region through the input unit, and updates and displays the position, the shape, and the size of the candidate region when receiving the change instruction, and receives an instruction input for confirming a measurement process target region through the input unit, and sets the candidate region at that time as the measurement target region.

In the displacement sensor according to the aspect of the invention, preferably the processing unit automatically sets a local region used in the set measurement process or a feature point used in the measurement process, and displays the local region or the feature point while the local region or the feature point overlaps the setting object image. In the displacement sensor according to the aspect of the invention, preferably the processing unit displays the local region or the feature point, and the processing unit receives a change in range of the local region or a change in setting of a parameter used to calculate the feature point, and when the processing unit receives the change input, the processing unit displays the feature point calculated based on the post-change local region or post-change parameter, the processing unit receives an instruction input for confirming the local region or the parameter used to calculate the feature point through the input unit, and the processing unit sets the local region or the parameter used to calculate the feature point at that time as the local region or the parameter used to calculate the feature point which is to be used in the measurement process.

The parameter used to calculate the local region includes pieces of information on vertically and horizontally end-portion positions of the local region. The parameter used to calculate the feature point includes an edge threshold with respect to the height direction for determining an edge point and a binarization threshold for distinguishing an upper portion from a lower portion in the measurement process target region.

In the displacement sensor according to the aspect of the invention, preferably the processing unit simultaneously displays peak height measurement for a reference height and bottom depth measurement for a reference height as measurement process options on the screen to receive selection of the option. In the displacement sensor according to the aspect of the invention, preferably in the measurement process, the processing unit simultaneously displays an option of measuring a step depth down to an upper stage with respect to a reference height and an option of measuring a step depth down to a lower stage with respect to the reference height on the screen to receive the selection of the option. In the displacement sensor according to the aspect of the invention, preferably in the measurement process, the processing unit simultaneously displays an option of measuring an edge position of a left-side step and an option of measuring an edge position of a right-side step in the screen to receive the selection of the option. In the displacement sensor according to the aspect of the invention, preferably in the measurement process, the processing unit simultaneously displays an option of measuring an interval between a left-side edge and a right-side edge of a projected upper stage and an option of measuring an interval between a right-side edge of a recessed left-side upper stage and a left-side edge of a right-side upper stage on the screen to receive the selection of the option.

In the displacement sensor according to the aspect of the invention, preferably in the option of the measurement process, the processing unit displays a projected icon described on a reference line existing in a lower portion for the measurement of peak height for the reference height, and displays a projected icon described below the reference line existing in an upper portion for bottom depth measurement to the reference height. In the displacement sensor according to the aspect of the invention, preferably, in the option of the measurement process, the processing unit displays an icon in which a line existing in an upper portion and other two lines are described for the measurement of step height up to the upper stage from the reference height, the two line being located on both sides of the line and below the line existing in the upper portion at the same height, and the processing unit displays an icon in which a line existing in a lower portion and other two lines are described for the measurement of step height up to the lower stage from the reference height, the two line being located on both sides of the line and the two lines being located at the same height above the line. In the displacement sensor according to the aspect of the invention, preferably, in the option of the measurement process, the processing unit displays an icon including a drawing for left-side edge measurement, the drawing including plural edges which are of boundary portions of the steps, a leftmost edge being displayed while distinguished from other portions in the drawing, and displays including a drawing for edge position measurement of the right-side step, the drawing including the plural edges which are of boundary portions of the steps, a rightmost edge being displayed while distinguished from other portions in the drawing. In the displacement sensor according to the aspect of the invention, preferably, in the option of the measurement process, the processing unit displays an icon indicating a left-side edge of a projected upper line and a right-side edge of a projected upper line for measurement of the interval between a projected upper left-side edge and a projected upper right-side edge, and displays an icon indicating positions of a right-side edge of a recessed left-side upper stage and a left-side edge of a recessed right-side upper stage for measurement of the interval between a right-side edge of a recessed left-side upper stage and a left-side edge of a recessed right-side upper stage.

In the displacement sensor according to the aspect of the invention, preferably the processing unit displays the icon to receive the selection of the option input through the input unit, and sets a kind of the measurement process to be set while the reference line or reference point for the measurement process is distinguished from others, in the process of setting the measurement process target region, the processing unit displays the setting object image on the display unit, and displays a candidate region of the measurement process target region while the candidate region overlaps the setting object image, receives an instruction to change a position, a shape, and a size of the candidate region through the input unit, and updates and displays the position, the shape, and the size of the candidate region when receiving the change instruction, and receives an instruction input for confirming a measurement process target region through the input unit, and sets the candidate region at that time as the measurement target region.

According to the invention, when the previously set measurement process is performed based on the plural local regions or feature points on the height distribution with respect to the direction along the line beam whose image is taken, the local region or feature point is automatically set in the measurement process target region by setting only one measurement process target region, which simplifies the setting work.

DETAILED DESCRIPTION OF THE PREFERRED EMBODIMENT

Then, a sensor apparatus according to a preferred embodiment of the invention will be described in detail with reference to the accompanying drawings. The following embodiment shows only an example of the invention, and the spirit and scope of the invention are defined only by appended claims.

A displacement sensor of the embodiment is a so-called amplifier-separated type displacement sensor which separately includes a signal processing unit and a sensor head unit in order that the compact displacement sensor can be accommodated in a control panel or in order that the displacement sensor is easily placed in a narrow and small measurement environment.

Figure 1:
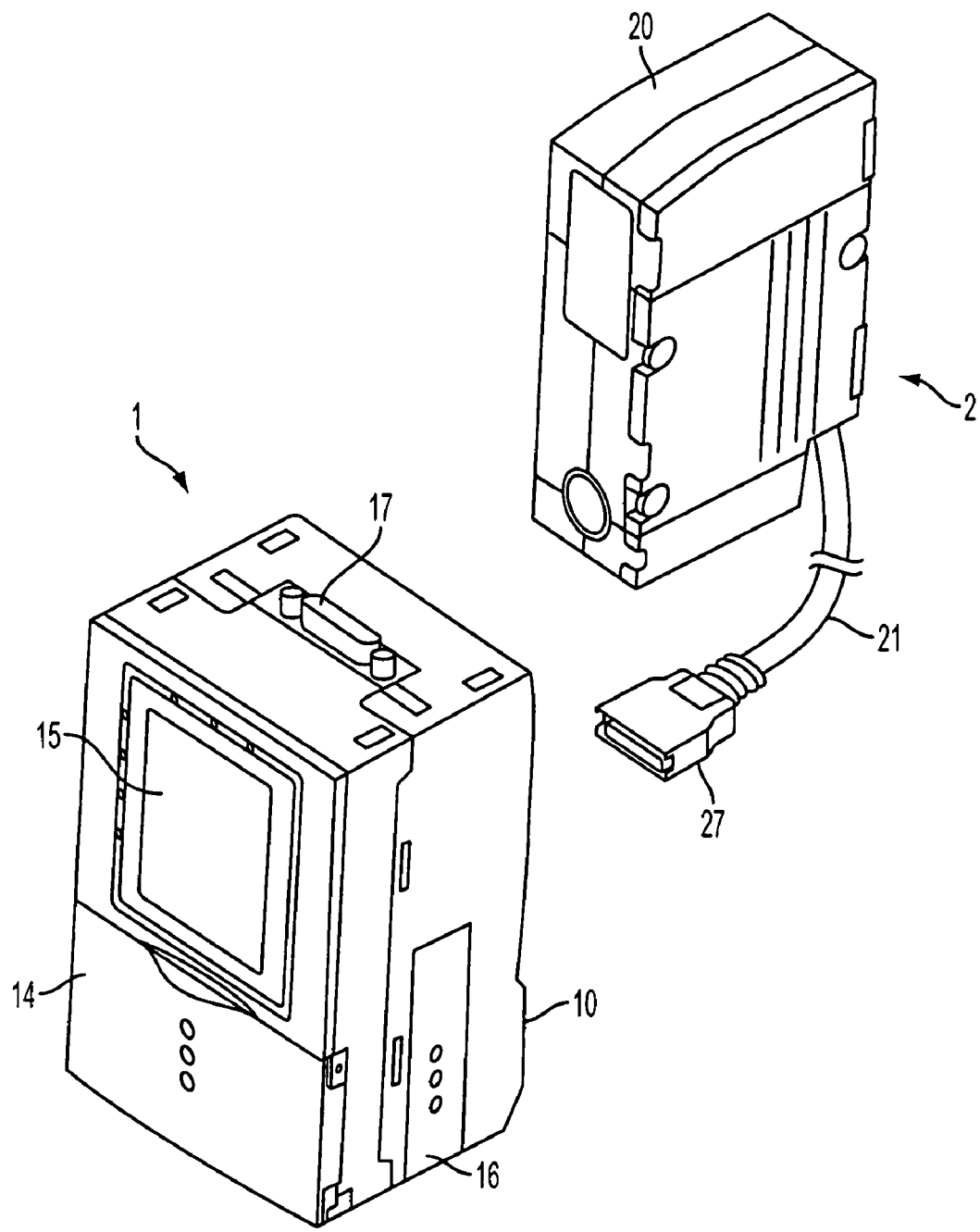
FIG. 1 shows a perspective view of appearances of a signal processing unit and a sensor head unit.

FIG. 1 shows a perspective view of appearances of a signal processing unit 1 and a sensor head unit 2 in the displacement sensor of the embodiment. An outer case 10 of the signal processing unit 1 has a slightly thin rectangular shape. An external connection cord (not shown) is drawn from a front face of the outer case 10. The external connection cord includes an external input line, an external output line, and a power supply line. The external input line is used to issue various commands to the signal processing unit 1 from PLC which is of an upper-level device, the external output line is used to output a switching output and an analog output which are generated in the signal processing unit 1 to PLC, and the power supply line is used to supply the power to an internal circuit of the signal processing unit 1. Although not shown, a USB connector and an RS-232C connector are provided in a front face of the outer case 10.

An operable operation-unit cover 14 is provided in an upper surface of the outer case 10. An operation unit is provided under the operation-unit cover 14 to perform various command operations in the signal processing unit 1. A display unit 15 is arranged in the upper surface of the outer case 10, and the display unit 15 displays measurement object image information or measurement result obtained by the sensor head unit 2, a measurement value, and a setting screen.

Inter-signal processing unit connector covers 16 are provided in side faces of the outer case 10. An inter-signal processing unit connector (junction connector 3) which connects another signal processing unit 1 are provided in the inter-signal processing unit connector covers 16. The plural signal processing units 1 can be connected in a line through a DIN rail while the adjacent signal processing units 1 are connected to each other. A sensor head unit connecting connector 17 is provided in a rear surface of the outer case 10 of the signal processing unit 1. The signal processing unit 1 is connected to the sensor head unit 2 through the sensor head unit connecting connector 17.

The sensor head unit 2 includes a signal processing unit connecting connector 27 corresponding to the sensor head unit connecting connector 17, a cable 21, and a sensor head main body unit 20.

Figure 2:
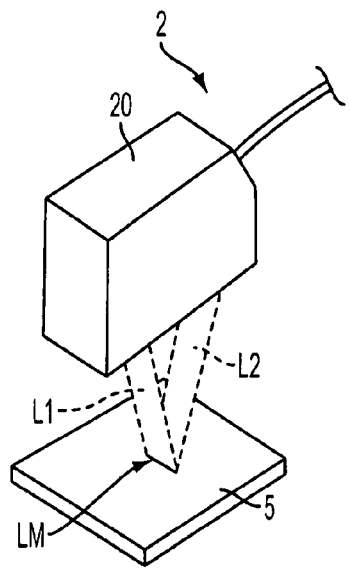
FIG. 2 shows a perspective view of appearances of the sensor head unit and a line beam.

As shown in FIG. 2, a surface of the measurement object 5 is illuminated with a pulsating laser beam (pulse light) emitted from a floodlighting device (laser diode) incorporated into the main body unit 20 in the form of slit light L1 through a floodlighting lens (not shown). Therefore, an illumination light image LM of the slit light is formed in the surface of the measurement object 5. The reflected light L2 of the slit light reflected from the measurement object 5 is incident to a two-dimensional imaging device (such as a photodiode array, CCD, and a CMOS imaging device) through a light acceptance lens (not shown) in the sensor head unit 2. That is, the surface of the measurement object 5 is imaged from different angles with the two-dimensional imaging device, which obtains a video signal including the illumination light image LM of the slit light. A predetermined feature amount is extracted based on the video signal, and a distribution of a target displace amount (distance between the sensor head unit 2 and the measurement object 5 in this example) is determined along the illumination light image LM.

Figure 3:
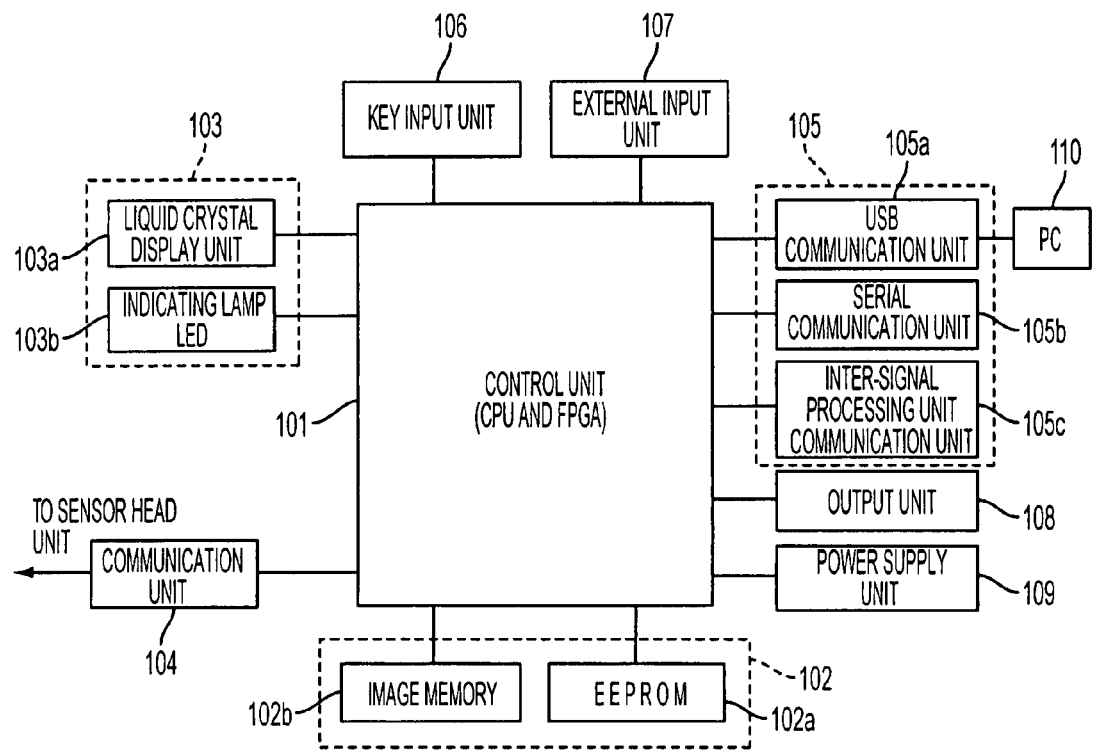
FIG. 3 shows a block diagram of an electric hardware configuration of the signal processing unit.

FIG. 3 shows a block diagram illustrating a whole of an electric hardware configuration of the signal processing unit 1 in the displacement sensor. As shown in FIG. 3, the signal processing unit 1 includes a control unit 101, a storage unit 102, a display unit 103, a communication unit 104 which conducts communication with the sensor head unit 2, a communication unit 105 which conducts communication with an external device, a key input unit 106, an external input unit 107, an output unit 108, and a power supply unit 109.

The control unit 101 includes CPU (Central Processing Unit) and FPGA (Field Programmable Gate Array), and the control unit 101 controls the whole of the signal processing unit 1. The control unit 101 realizes later-mentioned various functions. The control unit 101 also binarizes a light acceptance signal based on a predetermined threshold, and the control unit 101 transmits output data of the binarized light acceptance signal to the outside from the output unit 108.

The storage unit 102 includes a nonvolatile memory (EEPROM) 102a and an image memory 102b in which the image data displayed on the display unit 103 is stored.

The display unit 103 includes a liquid crystal display unit 103a and an indicating lamp LED 103b. The threshold and various numerical values concerning the distance to the measurement object are displayed on the liquid crystal display unit 103a, and the indicating lamp LED 103b indicates on and off states which are of a target output.

The communication unit 104 is used to product communication with the sensor head unit 2.

The external communication unit 105 includes a USB communication unit 105a, a serial communication unit 105b, and an inter-signal processing unit communication unit 105c. The USB communication unit 105a connects the displacement sensor to an external personal computer (PC) 110. The serial communication unit 105b is used to transmit and receive a command and program data. The inter-signal processing unit communication unit 105c conducts data communication with other signal processing units adjacent onto both sides of the signal processing unit according to a predetermined protocol and a transmission and reception format.

The key input unit 106 includes switches (not shown) and operation buttons (not shown) for performing various settings. The external input unit 107 receives various commands issued to the signal processing unit 1 from the upper-level device such as PLC. The output unit 108 is used to output the target on and off output to the upper-level device such as PLC. The power supply unit 109 supplies the electric power to the control unit 101 and the external hardware circuit.

Figure 4:
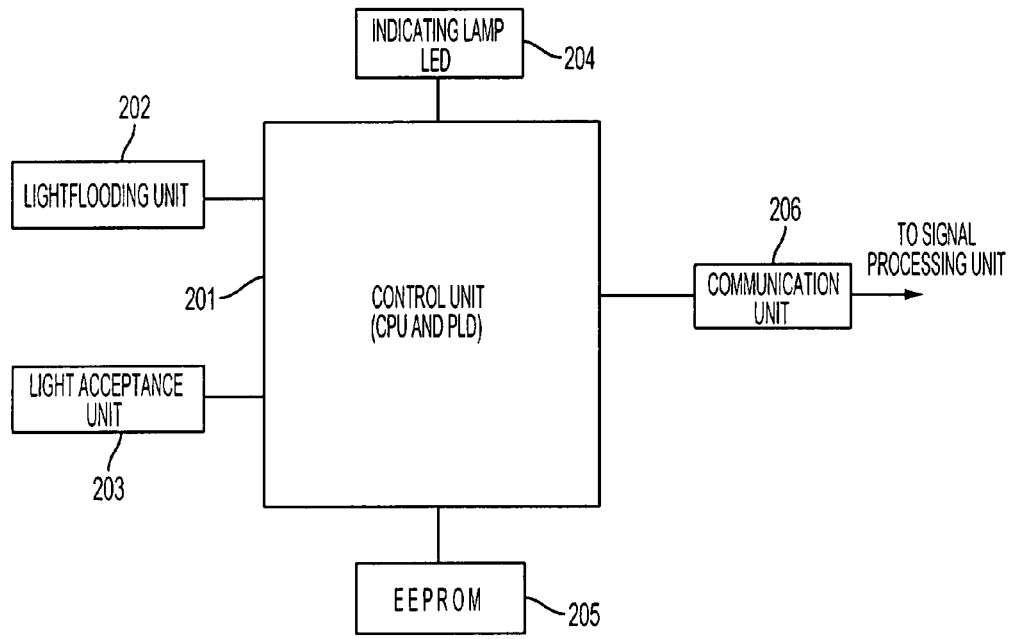
FIG. 4 shows a block diagram illustrating an electric hardware configuration of the sensor head unit.

FIG. 4 shows a block diagram illustrating an electric hardware configuration of the sensor head unit 2. As shown in FIG. 4, the sensor head unit 2 includes a control unit 201, a floodlighting unit 202, a light acceptance unit 203, an indicating lamp LED 204, a storage unit 205, and a communication unit 206. The floodlighting unit 202 illuminates the measurement object 5 with the slit light. The light acceptance unit 203 accepts the slit light reflected from the measurement object 5.

The control unit 201 includes CPU (Central Processing Unit) and PLD (Programmable Logic Device). The control unit 201 controls the whole of the components 202 to 206 in the sensor head unit, and the control unit 201 performs a process of taking out the light acceptance signal from the light acceptance unit 203 to transmit the light acceptance signal to the signal processing unit 1.

The floodlighting unit 202 includes the laser diode which is of the floodlighting device and a floodlighting circuit, and the floodlighting unit 202 illuminates the measurement target region with the slit light. The light acceptance unit 203 includes a two-dimensional imaging device (such as a photodiode array, CCD, and a CMOS imaging device) and a light acceptance signal processing unit. The two-dimensional imaging device accepts the reflected slit light. The light acceptance signal processing unit amplifies the light acceptance signal obtained from the two-dimensional imaging device in synchronization with a timing control signal from the control unit 201, and the light acceptance signal processing unit outputs the amplified light acceptance signal to the control unit 201. The indicating lamp LED 204 is turned on and off according to various operation states of the sensor head unit 2.

The storage unit 205 includes, e.g., a nonvolatile memory (EEPROM), and ID (identification information) for identifying the sensor head unit 2 is stored in the storage unit 205. The communication unit 206 is used to conducts communication with the signal processing unit 1 under orders of the control unit 201.

The sensor head unit 2 of the embodiment has the above circuit configuration to appropriately perform the floodlighting and light accepting processes according to the command of the signal processing unit 1.

Figure 5:
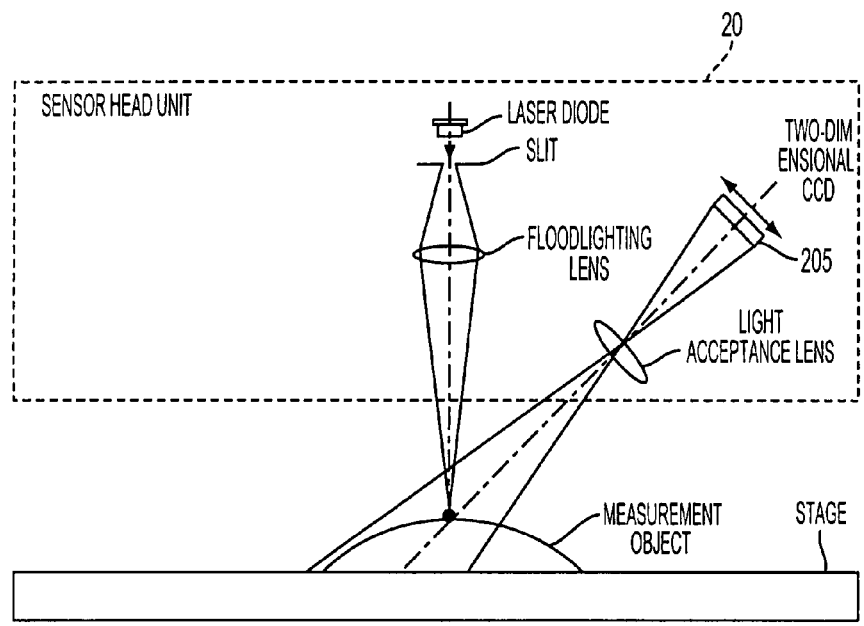
FIG. 5 shows an optical system of the sensor head unit.

FIG. 5 shows a sectional configuration of an optical system of the sensor head unit 2. In FIG. 5, the laser beam emitted from the laser diode is shaped in the light beam (slit light) having a line shape in cross section through the slit, and the surface of the measurement object is illuminated with the light beam in the form of the line beam through the floodlighting lens. Because FIG. 5 shows the sectional view, the measurement object is illuminated with the laser beam while the laser beam is focused as convergent light in the section of FIG. 5. However, the laser beam has a broadened light flux with respect to the direction perpendicular to the section, and the measurement object is illuminated with the slit light. On the other hand, an illumination light image of cut light generated by the line beam illumination is taken from a predetermined angle by the two-dimensional imaging device (two-dimensional CCD in this case) through the light acceptance lens. As is well known, a taking angle of the two-dimensional CCD is positioned according to a change in height of the measurement object such that imaging position of the light image on CCD is changed. Thus, the height is measured in each position of the line beam image along the direction perpendicular to the section based on a principle of triangulation.

Figure 6A:
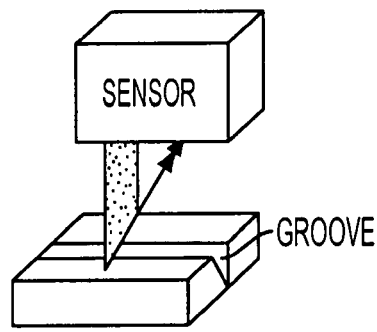
FIG. 6 shows an explanatory view of image processing for groove measurement.
Figure 6B:
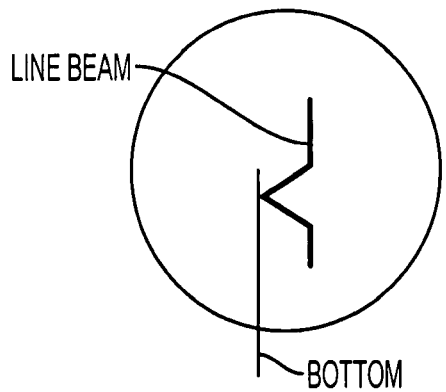
Figure 6C:
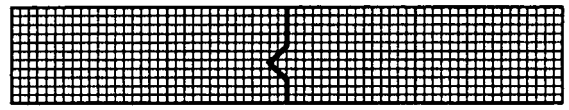

For example, measurement of a groove will be described with reference to FIG. 6. When the image of the surface of the object having a V-shape groove is taken with the sensor head unit as shown in FIG. 6A, a line beam image which becomes a large V-shape wave bright line emerges on the object surface according to a depth of a flaw as shown in FIG. 6B. An image shown in FIG. 6C is obtained as the line beam image on the corresponding light acceptance surface of the imaging device. In FIG. 6C, the position in the vertical direction corresponds to the position in the direction along the illuminated line of the line beam, and the position in the vertical direction corresponds to the height of the object surface at the position in the horizontal direction. When the height of the object surface is changed, the image is moved in the horizontal direction (displacement direction) on the light acceptance plane of the imaging device. When the height is calculated from the image in each position on the object surface illuminated with each line beam, the sectional shape of the image can be measured. In FIG. 6, the height of the image existing on the leftmost side corresponds to the bottom of the groove, so that the depth of the groove can be obtained as the measurement value by determining a difference with a height of another image.

Figure 7:
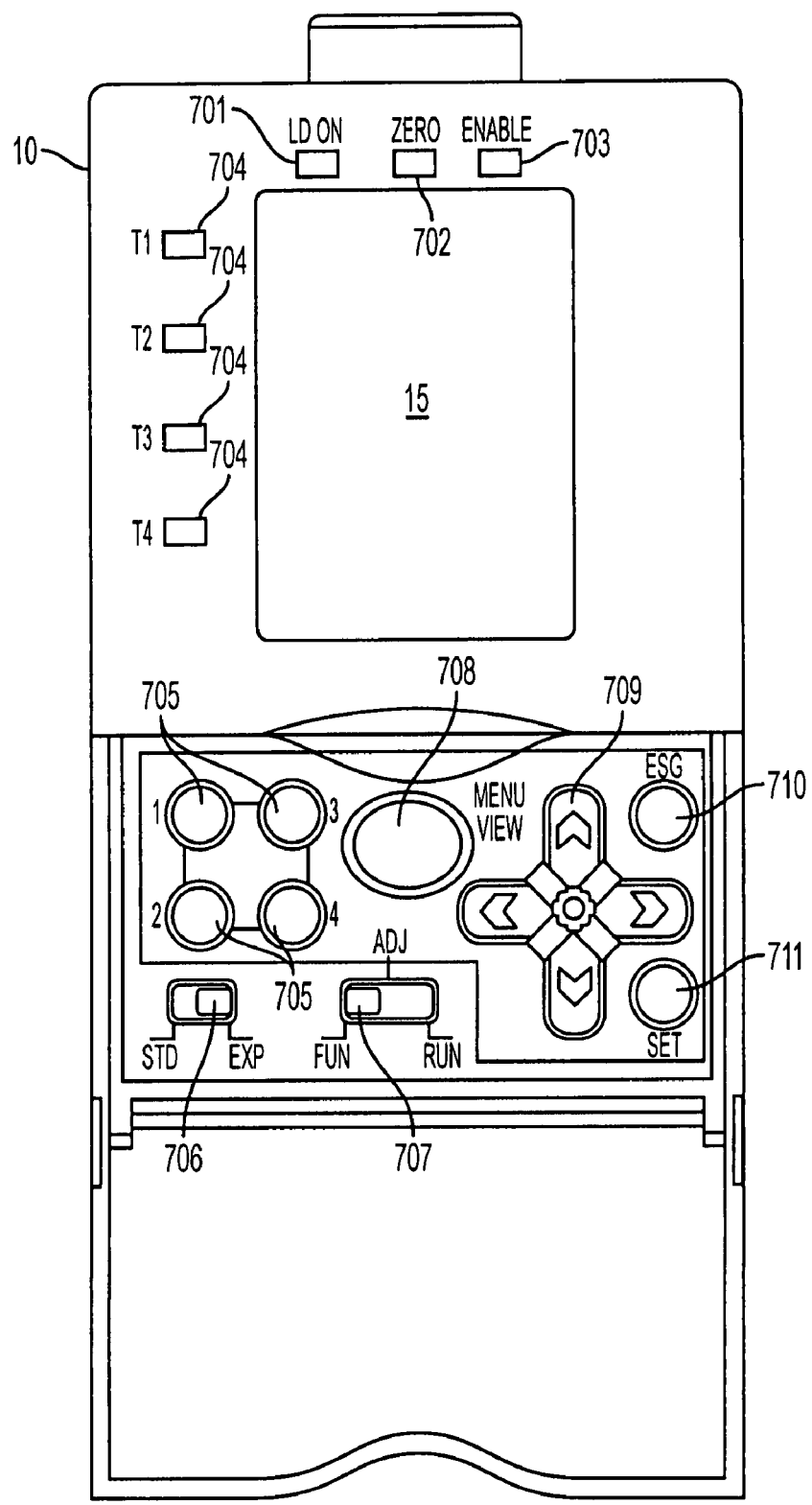
FIG. 7 shows a front view of the signal processing unit.

FIG. 7 shows the state in which an operation-unit cover 14 of the signal processing unit 1 is opened. An LDON indicating lamp 701, a ZERO indicating lamp 702, and an ENABLE indicating lamp are arranged in an upper side of the upper surface of the outer case 10. The LDON indicating lamp 701 is lit on when the sensor head unit 20 emits the laser beam. The ZERO indicating lamp 702 is lit on when a zero reset function of performing calculation by subtracting a set offset value is enabled. The ENABLE indicating lamp indicates the state in which the measurement can be performed. Indicating lamps 704 arranged on the left side are used to display result when a determination of the measurement result is made based on the threshold. For example, an indicating lamp is lit on when the measurement value is larger than the threshold, an indicating lamp is lit on when the measurement value is smaller than the threshold, and an indicating lamp is lit on when the measurement value is located between two thresholds.

Four function keys 705 are provided under the operation unit cover 14. In a setting mode (FUN mode) for setting contents of the measurement, the function keys 705 function as selection keys for selecting icons which are displayed on the display unit 15 while each two icons are arranged vertically and horizontally, and the function keys 705 function as selection keys for selecting selection candidates which are displayed while designated by the numerals 1 to 4. A lower left switch 706 selects a standard mode (STD) operation or an expert mode (EXP) operation. A setting method described in detail later is enabled when the switch 706 is switched to the standard mode, and a setting mode of separately setting each measurement point or area like the conventional method is enabled when the switch 706 is switched to the expert mode. In a mode switch 707 located on the light side of the switch 706, a FUN mode is located at the left end position to perform the setting, an ADJ mode is located at the central position to set the threshold for making a determination of the measurement result and to adjust the threshold, and a RUN mode is located at the right end position to perform the measurement process. The mode switch 707 is switched to each position to perform the operation of the corresponding mode. A MENU/VIEW key also functions as a so-called teaching key when the a menu screen, a screen of the measurement object image, and a screen of the measurement result are switched in each time the key is pressed down, or when the target image to be set is determined during the setting. An arrow key 709 is used to move a later-mentioned setting area vertically and horizontally and to move a selection candidate displayed on the display unit 15 vertically and horizontally. A lower right SET key 711 is used to make the determination of the selection candidate. An ESC key 711 cancels the previous operation.

Figure 8:
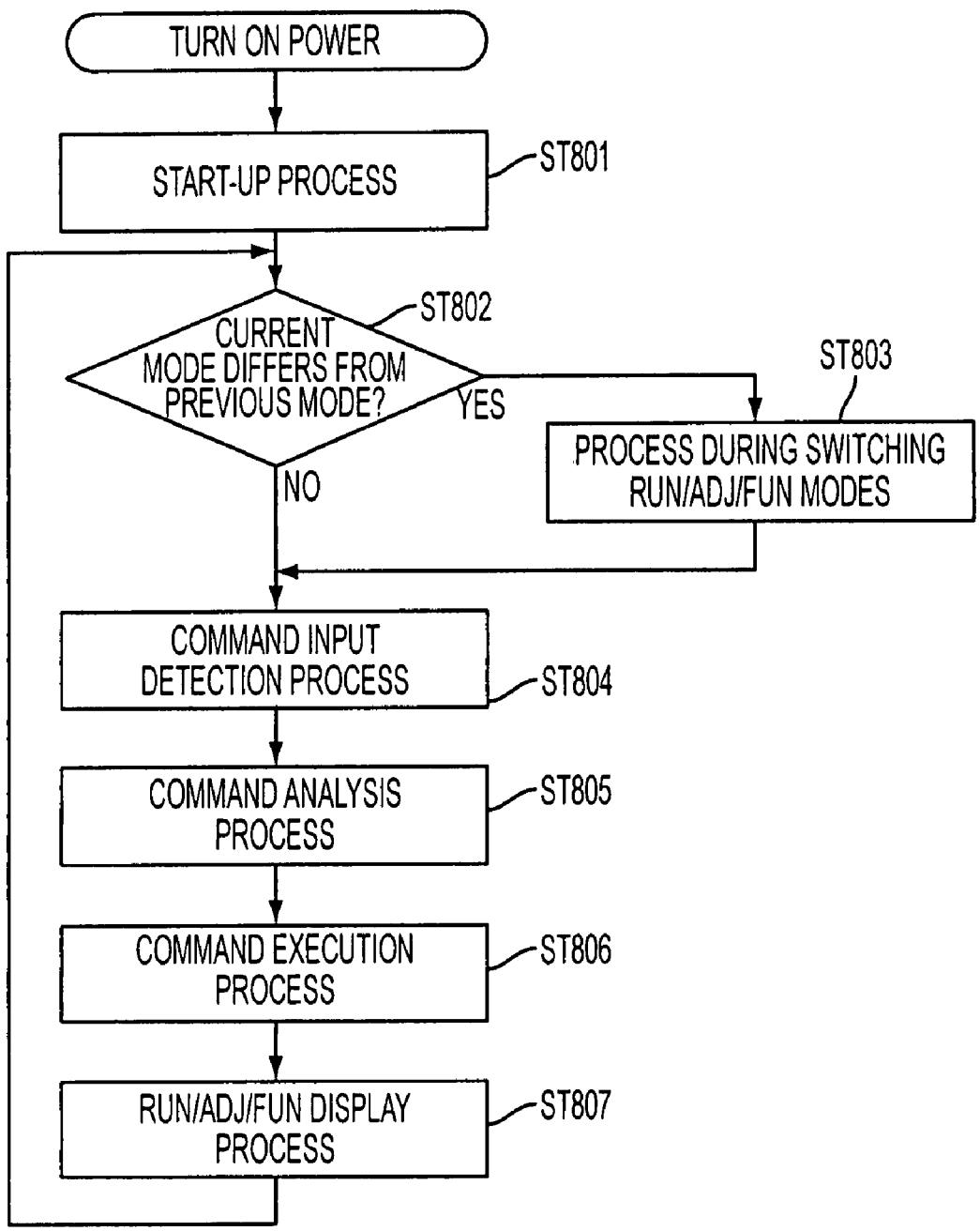
FIG. 8 shows a general flowchart illustrating an operation of the signal processing unit.

FIG. 8 shows a main operation flow in the embodiment. When the power is turned on to start the process, start-up process such as initial setting is performed (Step 801), and the mode of the mode switch is confirmed to determine whether or not the currently set mode differs from the previously set mode (Step 802). When the currently set mode differs from the previously set mode, the switching process of switching the previously set mode to the currently set mode is performed and the flow goes to the next step (Step 803). When the mode is not changed, the flow goes directly to the next step. Then, a command input is accepted according to the set mode. When the command input is accepted, the command is analyzed to perform the process according to the command. The process of setting the measurement is performed in the case of the FUN mode, the measurement process set in the FUN mode is performed in the case of the RUN mode, and the process of setting and adjusting the threshold for making the right or wrong determination of the measurement result used in the RUN mode in the case of the ADJ mode. A display process, e.g., the screen display of the measurement result is performed according to each process, and the flow returns to Step 802. In this case, although FIG. 8 shows the typical flow from Steps 804 to 807, actually the flow is not limited to processes shown in FIG. 8, but the a necessary process is appropriately added in the proper order.

When the FUN mode is selected by the mode switch 707, the measurement process is set. The processes corresponding to Steps 804 to 807 become specifically a flow shown by transition of the display screens of FIG. 9.

Figure 9:
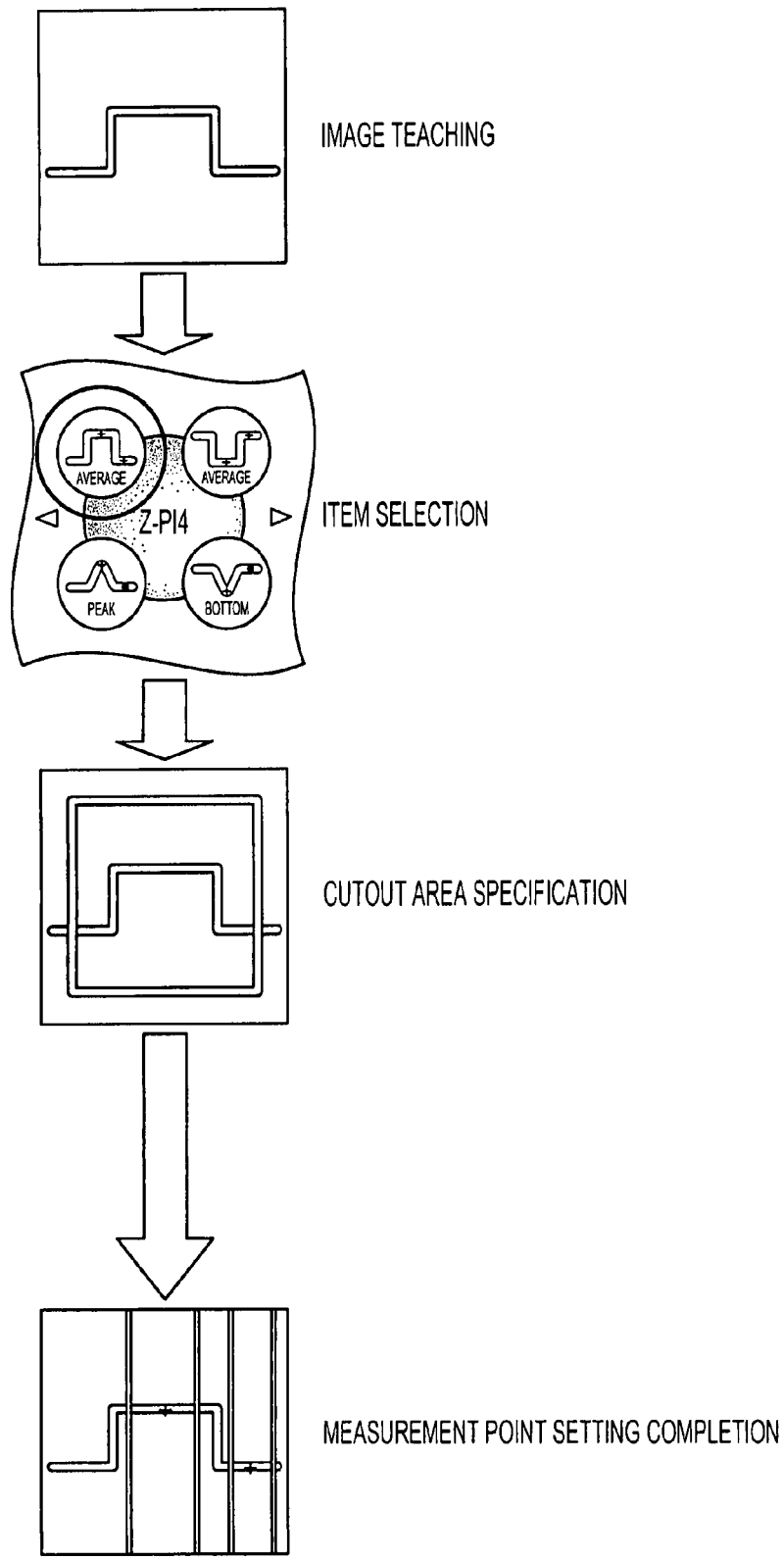
FIG. 9 shows screen transition of a FUN mode.

When the FUN mode is selected to start the process, the image whose light is accepted by the imaging device is displayed on the display unit 15 of the signal processing unit 1. When the measurement object is arranged in an area (measurable area) where the line beam and an imageable area intersect each other, the line beam image formed by the illumination of the object surface is taken with the imaging device, and the taken line beam image is displayed on the display unit 15. The Uppermost portion of FIG. 9 schematically shows the image (teaching image) to which teaching is performed. In the display of the embodiment, the height information is not shown in the horizontal direction of the screen unlike FIG. 6C, the horizontal direction of the screen corresponds to the direction along the line of the line beam image, and the vertical direction of the screen corresponds to the direction which is changed according to the height of the measurement object. In addition, as the height of the measurement object illuminated with the line beam is increased, the image emerges on the upper side in the vertical direction of the screen. Each pixel has light acceptance amount information corresponding to brightness of the accepted light. The displayed image may be one in which a filtering process, a time averaging process, a process of connecting broken points, and a thinning process are performed to the taken image. In the embodiment, the image having optimum sensitivity is extracted in each vertical direction, and the image in which the extracted images are combined is displayed. Further, a median filtering process is performed with respect to the horizontal direction. The median filtering process is one in which, in each horizontal position of the line beam image, an intermediate value of three pieces of height information including the height information on the position and the pieces of height information on the right and left sides of the position is set to a height value of the position. Therefore, electric spike noises are removed. Moreover, the image in which the pixel having the highest light acceptance amount is extracted in each line in the vertical direction cam also be displayed. A user adjusts arrangement of the measurement object or displacement sensor such that the point where the measurement object is measured is displayed as the image, and the user performs the teaching by pressing the MENU/VIEW key 708. When the MENU/VIEW key 708 is pressed, the image displayed at that time is set to a reference image (teaching image) used in the measurement setting.

Then, plural selection candidates (hereinafter referred to as measurement item) of the measurement process performed to the image to which the teaching is performed is displayed in the form of the icon to accept the selection. The icons concerning the height, a two-point step, a three-point step, an edge position, and an edge width are prepared as the measurement item. Although each of the icons is described in detail later, each two of the measurement item icons displayed in this case are arranged vertically and horizontally corresponding to the function keys 705. For example, when the upper left function key (1) is pressed, the measurement process shown by the upper left icon is selected. Other function keys (2 to 4) also correspond to the icons in the positional relationship, the selection is easily performed. Because only the four measurement items are displayed once, different four measurement items are sequentially displayed by the input of the right and left keys of the arrow key 709. When the measurement process of the measurement item is selected to complete the setting by the user, the mode is switched to the RUN mode, and the selected measurement process is performed. Alternatively, a function of witching plural banks and the measurement item may be set in each bank.

Then, one process target image extraction area (cutout area) including the image which becomes the target of the measurement process performed by the measurement item selected by the icon is displayed. In the embodiment, a frame having two-thirds to three quarters of the screen is initially displayed in the center of the screen. However, the size of the frame is not limited to the embodiment. For example, the frame including the whole of the screen may be displayed. The position, range, shape of the frame can be adjusted, and the input of the arrow key 709 is accepted to adjust the position and range. When the SET key 711 is pressed, the frame displayed at that time is set to the cutout area. Accordingly, when the point necessary to perform the measurement process set by the measurement item is displayed within the previously determined frame, the user directly determines the point by the SET key. When the position is not located in the frame, the user determines the point after adjusting the frame. The cutout area is set by the determination, and the measurement process is performed to the determined area according to the set measurement item during the RUN mode.

When the cutout area is set, the measurement range or measurement point used in the measurement process is automatically set from the cutout area according to the process of each measurement item selected by the icon, and the automatically set measurement range or measurement point is displayed which overlapped on the teaching image for the purpose of confirmation. The input of the arrow key 709 is accepted to adjust the measurement range. When the SET key 711 is pressed, the measurement range or measurement point to the cutout area at that time is confirmed and set. The lowermost portion of FIG. 9 shows an example of the two-point step, the upwardly projected line indicates the teaching image a + mark indicates the measurement point, and the range sandwiched by vertical lines located on both sides of each + mark indicates the measurement range where the averaging process is performed to calculate the measurement point. When the measurement range is correctly set from the viewpoint of the relationship with the teaching image, the user directly presses the SET key 711. The user presses the SET key 711 after the measurement range is adjusted by the operation of the arrow key 709 if needed. Therefore, in the RUN mode, the measurement process is performed to the set cutout area based on the measurement range or measurement point. In the presence or absence of the final fine adjustment of the measurement range, the enable and disable may be switched by the setting.

FIGS. 10 to 14 show display screens on which the selection of the measurement item is accepted to perform the setting. In each drawing, the four measurement item icons are displayed once. The display screens shown in FIGS. 10 to 14 are sequentially switched by the operation of the right and left keys of the arrow key 709. In the embodiment, because a 1.8-inch liquid crystal display screen is used, desirably the two to nine icons are displayed once in consideration of visibility and usability.

Figure 10:
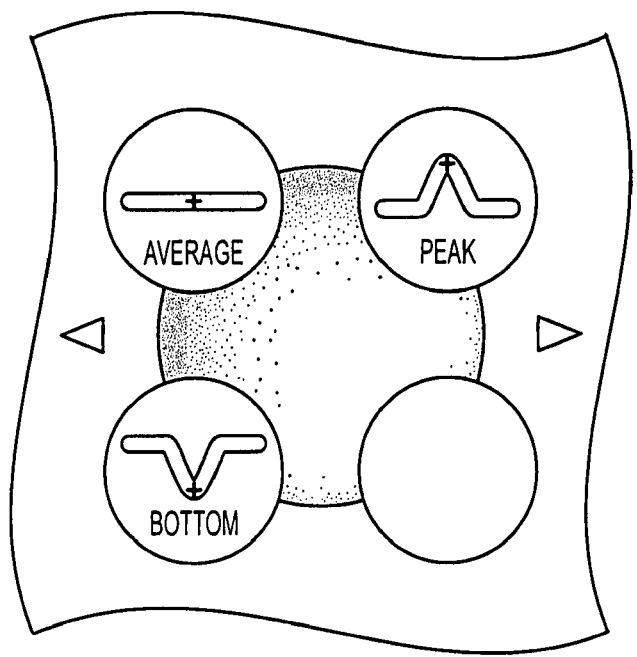
FIG. 10 shows a selection screen of a measurement item with respect to height measurement.

The display screen of FIG. 10 collectively displays the icons on one screen in order to accept the selection of the measurement items concerning the height measurement. In this case, the icons for selecting the three measurement items of an average measurement process (upper left), a peak height measurement process (upper right), and a bottom height measurement process (lower left) are displayed on one screen. The average measurement process is a calculation process of the average height in the cutout area set later. The peak height measurement process is a calculation process of the height which becomes the peak in the cutout area. The bottom height measurement process is a calculation process of the height of the lowest position in the cutout area.

Figure 11:
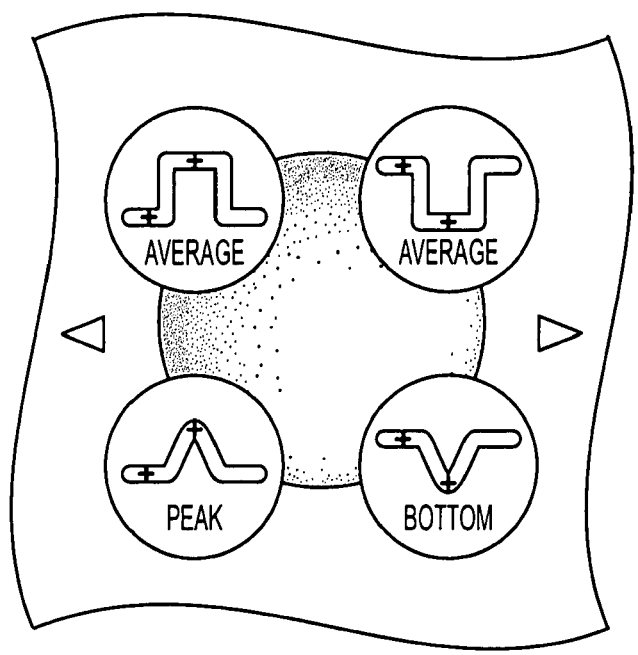
FIG. 11 shows a selection screen of a measurement item with respect to two-point step measurement.

The display screen of FIG. 11 simultaneously displays icons for accepting the selection of the measurement process concerning the two-point step measurement. The upper left icon indicates the process of measuring a projected step based on a bottom surface and the measurement process (projected average two-point step measurement) of determining the step up to an upper average height of the projected step from the average height of the bottom surface. The upper right icon indicates the process of measuring a recessed step based on an upper surface and the measurement process (recessed average two-point step measurement) of determining the step up to a recess average height of the recessed step from the average height of the upper surface. The lower left icon indicates the measurement process (projected peak two-point step measurement) of determining the step up to the projected peak height based on the average height of the bottom surface. The lower right icon indicates the measurement process (recessed bottom two-point step measurement) of determining the step up to the recessed peak height based on the average height of the upper surface. The icons for selecting the four measurement items are displayed on one screen.

A horizontal line indicating the upper stage of the projected step and two horizontal lines are included in the display of the upper left icon for the projected average two-point step measurement. The two horizontal lines are arranged on both sides of the horizontal line and have a common height lower than the horizontal line. The upper left icon visually displays the step measurement up to the upper stage of the projected step based on the bottom surface. A projected shape whose peak position is indicated by the mark and two horizontal lines are included in the display of the lower left icon for the projected peak two-point step measurement. The two horizontal lines are arranged on both sides of the projected shape and have a common height lower than the projected shape. The lower left icon visually displays the step measurement up to the projection peak based on the bottom surface. A horizontal line indicating the lower stage located at the recessed position of the recessed step and two horizontal lines are included in the display of the upper right icon for the recessed average two-point step measurement. The two horizontal lines are arranged on both sides of the horizontal line and have a common height higher than the horizontal line. The upper right icon visually displays the step measurement up to the lower stage which is of the recess based on the upper surface. A recessed shape whose bottom position is indicated by the mark and two horizontal lines are included in the display of the lower right icon for the recessed bottom two-point step measurement. The two horizontal lines are arranged on both sides of the projected shape and have a common height higher than the recessed shape. The lower right icon visually displays the step measurement up to the recess bottom based on the upper surface. In each icon, a point mark is displayed at the representative point such as the center of each horizontal line and the average coordinate, and the point marks are displayed at the peak position and the bottom position in the peak display and bottom display.

In this case, the selection is accepted while the icon for the projected average two-point step measurement and the icon for the recessed average two-point step measurement are displayed on the same screen, or the selection is accepted while the icon for the projected peak two-point step measurement and the icon for the recessed bottom two-point step measurement are displayed on the same screen. In the conventional method, "two-point step measurement" is set to the measurement item, the steps of the two points are set in the area, and the user determines the reference surface such that the step from the reference surface is measured. However, in the embodiment, because the measurement area or measurement point is automatically set, information indicating that the reference surface is located in either the upper stage or the lower stage is also obtained. When the reference surface is located in the opposite stage, because a sign of the measurement value becomes different, the measurement value is not matched with feeling of the user or a problem possibly causing a setting mistake is generated. However, the configuration of the embodiment avoids such problems. The reason why the pair of different processes is simultaneously displayed in the reference surface is as follows. In the two-point step measurement, when the selection candidates are separately arranged in the different screen, usually the user simply recognizes two-point step measurement while being unconscious of the reference surface, so that the two-point step process is selected by one of the icons found first by the user.

Figure 12:
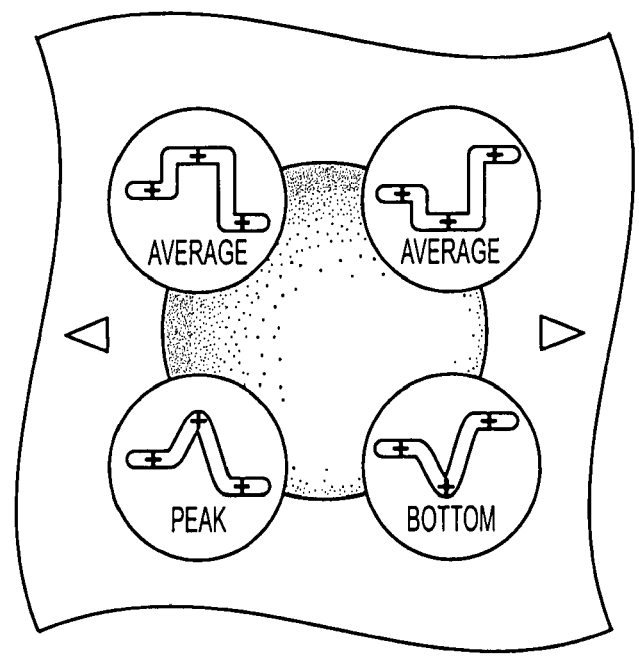
FIG. 12 shows a selection screen of a measurement item with respect to three-point step measurement.

The display screen of FIG. 12 simultaneously displays icons for accepting the selection of the measurement process concerning the three-point step measurement. The upper left icon indicates the projected average three-point step measurement. The projected average three-point step measurement is a projected step measurement process based on the bottom surface. However, the projected average three-point step measurement differs from the projected average two-point step measurement in that the bottom surface is determined as the average height of the two stages located at the lower positions and the step up to the upper average height of the projected step is determined based on the average height. The upper right icon indicates the recessed average three-point step measurement. The recessed average three-point step measurement is a recessed step measurement process based on the bottom surface. However, the recessed average three-point step measurement differs from the recessed average two-point step measurement in that the upper surface is determined as the average height of the two stages located at the higher positions and the step up to the recess average height of the recessed step is determined based on the average height. The lower left icon indicates the projected peak three-point step measurement. The projected peak three-point step measurement is a measurement process in which the bottom surface is determined as the average height of the two stages located at the lower positions and the step up to the projected peak height is determined based on the average height. The lower right icon indicates the recessed bottom three-point step measurement. The recessed bottom three-point step measurement is a measurement process in which the upper surface is determined as the average height of the two stages located at the higher positions and the step up to the recessed bottom height is determined based on the average height. The icons for selecting the four measurement items are displayed on one screen.

A horizontal line indicating the upper portion of the projected step and two horizontal lines are included in the display of the upper left icon for the projected average three-point step measurement. The two horizontal lines are arranged on both sides of the horizontal line and have different heights lower than the horizontal line. The upper left icon visually displays the step measurement up to the projected portion based on the bottom surface. A projected shape whose peak position is indicated by the mark and two horizontal lines are included in the display of the lower left icon for the projected peak three-point step measurement. The two horizontal lines are arranged on both sides of the projected shape and have different heights lower than the projected shape. The lower left icon visually displays the step measurement up to the projection peak based on the bottom surface. A horizontal line indicating the lower stage located at the recessed position of the recessed step and two horizontal lines are included in the display of the upper right icon for the recessed average three-point step measurement. The two horizontal lines are arranged on both sides of the horizontal line and have different heights higher than the horizontal line. The upper right icon visually displays the step measurement up to the recessed portion based on the upper surface. A recessed shape whose bottom position is indicated by the mark and two horizontal lines are included in the display of the lower right icon for the recessed bottom three-point step measurement. The two horizontal lines are arranged on both sides of the projected shape and have different heights higher than the recessed shape. The lower right icon visually displays the step measurement up to the recess bottom based on the upper surface. The two horizontal lines having the different heights may be an oblique line, and the two horizontal lines may be displayed as the lines along a common oblique line. In each icon, as with the two-point step, a point mark is displayed at the representative point such as the center of each horizontal line and the average coordinate, and the point marks are displayed at the peak position and the bottom position in the peak display and bottom display.

As with the display of the two-point step, the selection is accepted while the icon for the projected average three-point step measurement and the icon for the recessed average three-point step measurement are displayed on the same screen, or the selection is accepted while the icon for the projected peak three-point step measurement and the icon for the recessed bottom three-point step measurement are displayed on the same screen. In the conventional method, "three-point step measurement" is set to the measurement item, the steps of the three points are set in the area, and the user determines the reference surface from one of the averages of steps such that the step from the reference surface is measured. However, in the embodiment, because the measurement area or measurement point is automatically set, information indicating that the reference surface is located in either the upper stage or the lower stage is also obtained. When the reference surface is located in the opposite stage, because the sign of the measurement value becomes different, the measurement value is not matched with the feeling of the user or the problem possibly causing a setting mistake is generated. However, the configuration of the embodiment avoids such problems.

Figure 13:
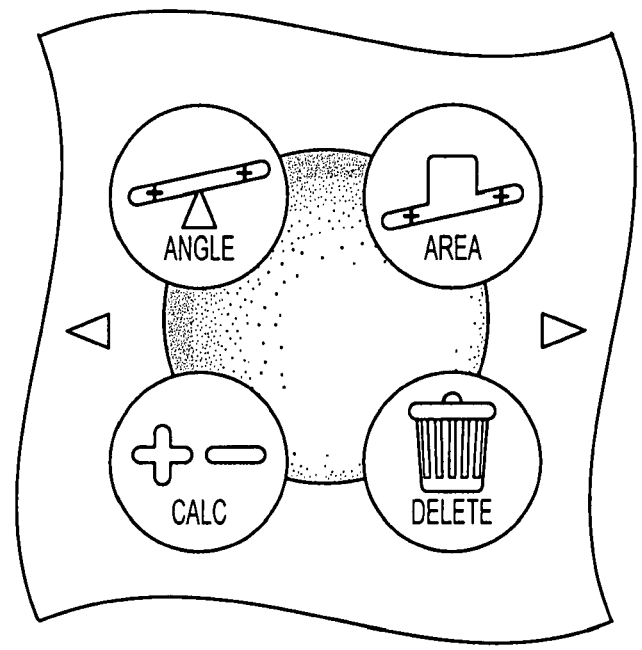
FIG. 13 shows a selection screen of a measurement item with respect to angle and sectional area measurements.

In FIG. 13, the icon for the inclination measurement is shown in the upper left portion, the icon for sectional area measurement is shown in the upper right portion, and the selection is accepted.

Figure 14:
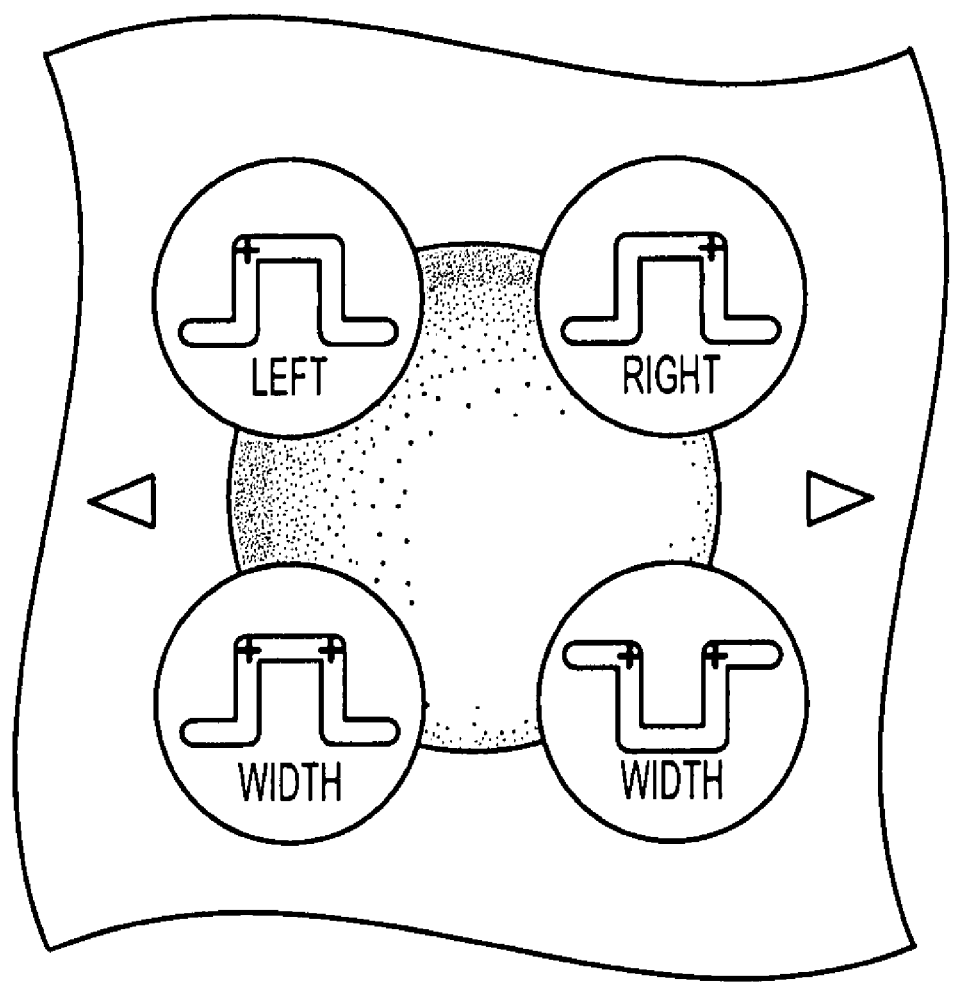
FIG. 14 shows a selection screen of a measurement item with respect to edge measurement.

The display screen of FIG. 14 simultaneously displays icons for accepting the selection of the measurement process concerning edge position measurement and edge width measurement. The upper left icon indicates left edge position measurement. The left edge position measurement is an extraction process of an edge located on the leftmost side, i.e., a boundary of the step in the cutout area set in the subsequent step. The upper right icon indicates right edge position measurement. The right edge position measurement is an extraction process of an edge located on the rightmost side in the cutout area set in the subsequent step. The lower left icon measures an edge width of the projected upper surface. The edge width measurement is a process of measuring an interval between edges at both ends of the projected upper surface, i.e., the boundary of the step existing on both sides of the upper surface. The lower right icon measures the edge width of the recessed upper surface. The edge width measurement is a process of measuring the interval between edges at both ends of the upper surface surrounding the recess portion, i.e., the boundary of the step in the upper surface.

Each of detailed processes after the measurement items are selected with the icons will sequentially be described below.

In each process, the initial setting frame of the process target image extraction area (cutout area) is displayed along with the teaching image to accept the change and the specification of the cutout area. The cutout area is set to a rectangular area, a coordinate at an upper left point of the cutout area is set to a measurement start point (x1,y1), and a coordinate at a lower right point of the cutout area is set to a measurement end point (x2,y2). Therefore, the user specifies the cutout area such that the line beam image where the process selected by the measurement items such as the average, peak, bottom, tow-point step, three-point step, edge position, and edge width is performed.

Figure 15:
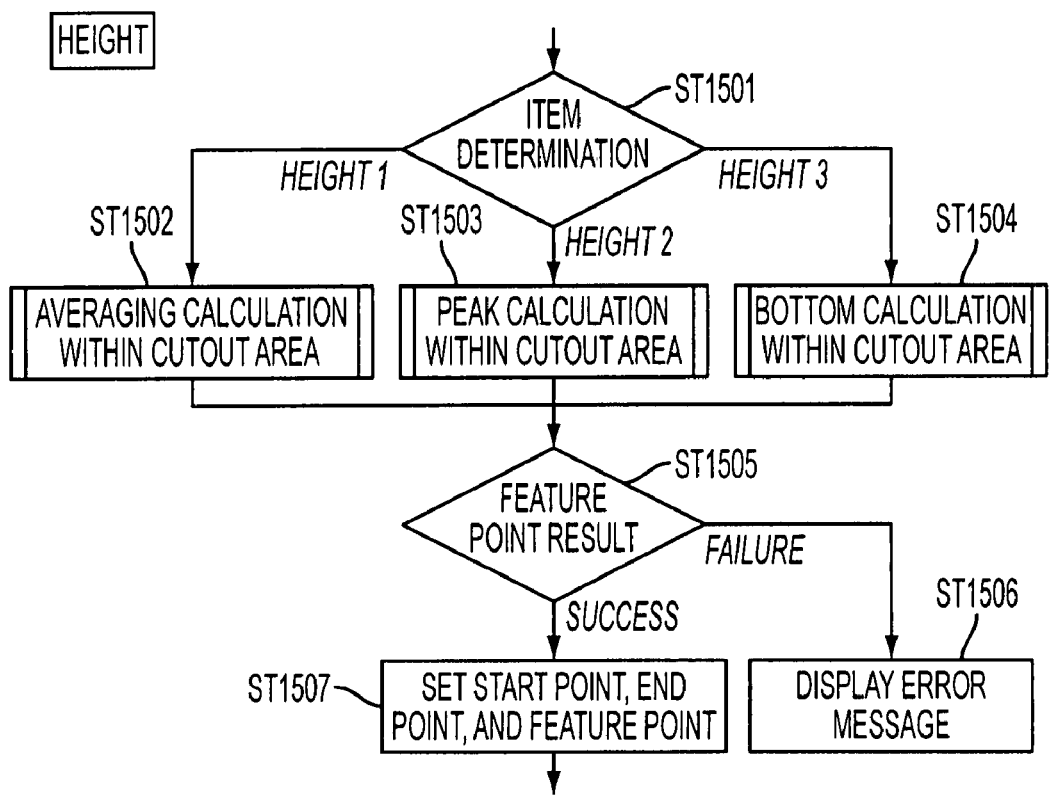
FIG. 15 shows a flowchart of the detailed height measurement.
Figure 16:
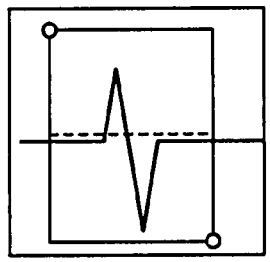
FIG. 16 shows a cutout area and an automatically set measurement area in the height measurement.
Figure 16:
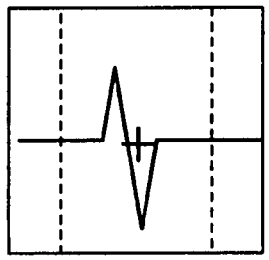
Figure 16:
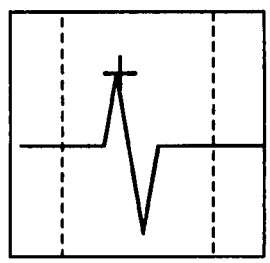
Figure 16:
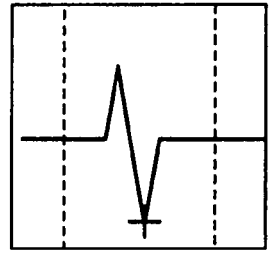

FIGS. 15 and 16 show the process when the height measurement, i.e., one of the average measurement, peak height measurement, and bottom height measurement is selected as the measurement item. The determination of the measurement item is made (Step 1501), and the process is started according to the set measurement item (Steps 1502 to 1504).

When the average measurement process is selected as the measurement item, the coordinate in the vertical direction is read in each coordinate from x1 to x2. Averaging calculation is performed in the case of Step 1502, peak extraction calculation is performed in the case of Step 1503, and bottom extraction calculation is performed in the case of Step 1504. During performing the above step, in the abnormal case such as the absence of the point to be extracted, in the case where the information on the light acceptance amount possessed by each pixel of the line beam image is smaller than a predetermined value, or in the case where the information on the light acceptance amount is excessively larger than the predetermined value, there is a possibility of wrong measurement due to an influence of a noise or saturation, so that an error message is displayed (Steps 1505 and 1506). In the case of no anomaly, a measurement start point, a measurement end point, and a feature point are set to calculation result (Step 1507). In the average measurement, the feature point is an x-coordinate value determined by a midpoint of x1 and x2 and an average y-coordinate value determined by the calculation. In the peak measurement, the feature point is a peak coordinate. In the bottom measurement, the feature point is a bottom coordinate.

Then, the teaching image, the line indicating the positions at right and left ends of the x-coordinate of the process target image extraction area (cutout area), and the feature point obtained as the calculation result are displayed corresponding to the display of Step 807 of FIG. 9 while overlapping one another. At this point, the line indicating the positions at the right and left ends of the x-coordinate of the process target image extraction area (cutout area) can be adjusted, a movement input is accepted through the arrow key, and the measurement area which is of the calculation target may be fixed by pressing the SET key. When the line is changed, the new values of x1 and x2 after the change are set to the measurement start point and the measurement end point again, and the feature point is determined by the calculation again.

Figure 17:
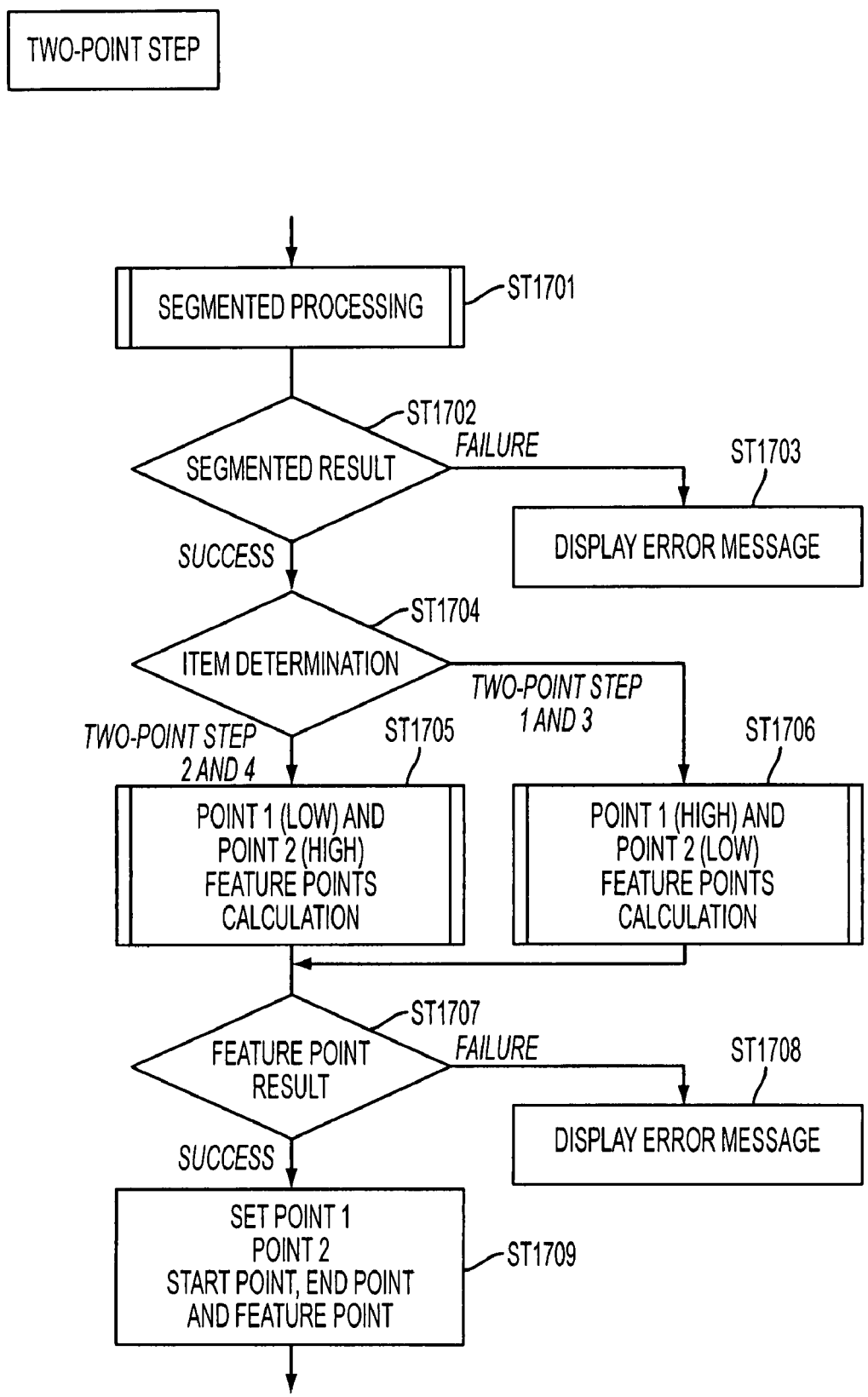
FIG. 17 shows a flowchart of the detailed two-point step measurement.
Figure 18:
FIG. 18 shows a cutout area and an automatically set measurement area in the two-point step measurement.
Figure 18:
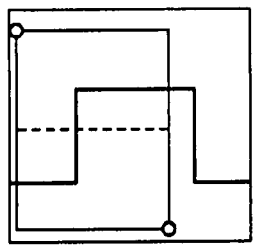
Figure 18:
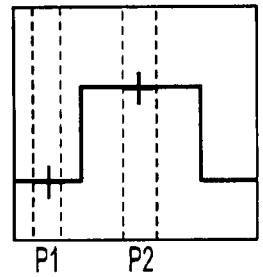
Figure 18:
Figure 18:
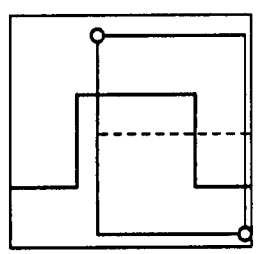
Figure 18:
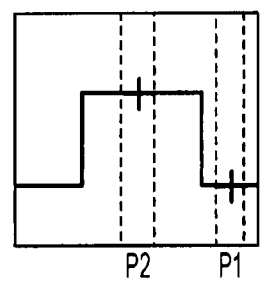
Figure 18:
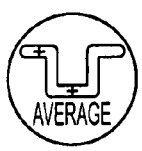
Figure 18:
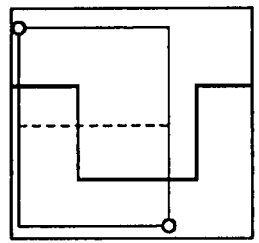
Figure 18:
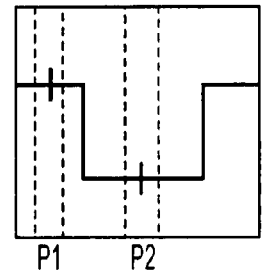
Figure 18:
Figure 18:
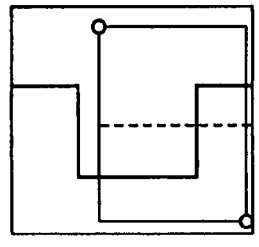
Figure 18:
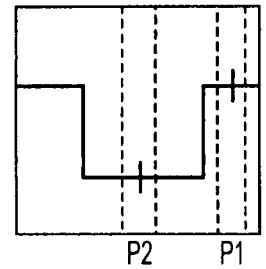

FIGS. 17 and 18 show the process when the two-point step measurement, i.e., one of the projected average two-point step measurement, recessed average two-point step measurement, projected peak two-point step measurement, and recessed bottom two-point step measurement is selected as the measurement item. Referring to FIG. 17, even if any measurement item is selected in the two-point step measurement, the segmented processing is performed as a pre-process commonly used in each measurement (Step 1701).

Figure 19:
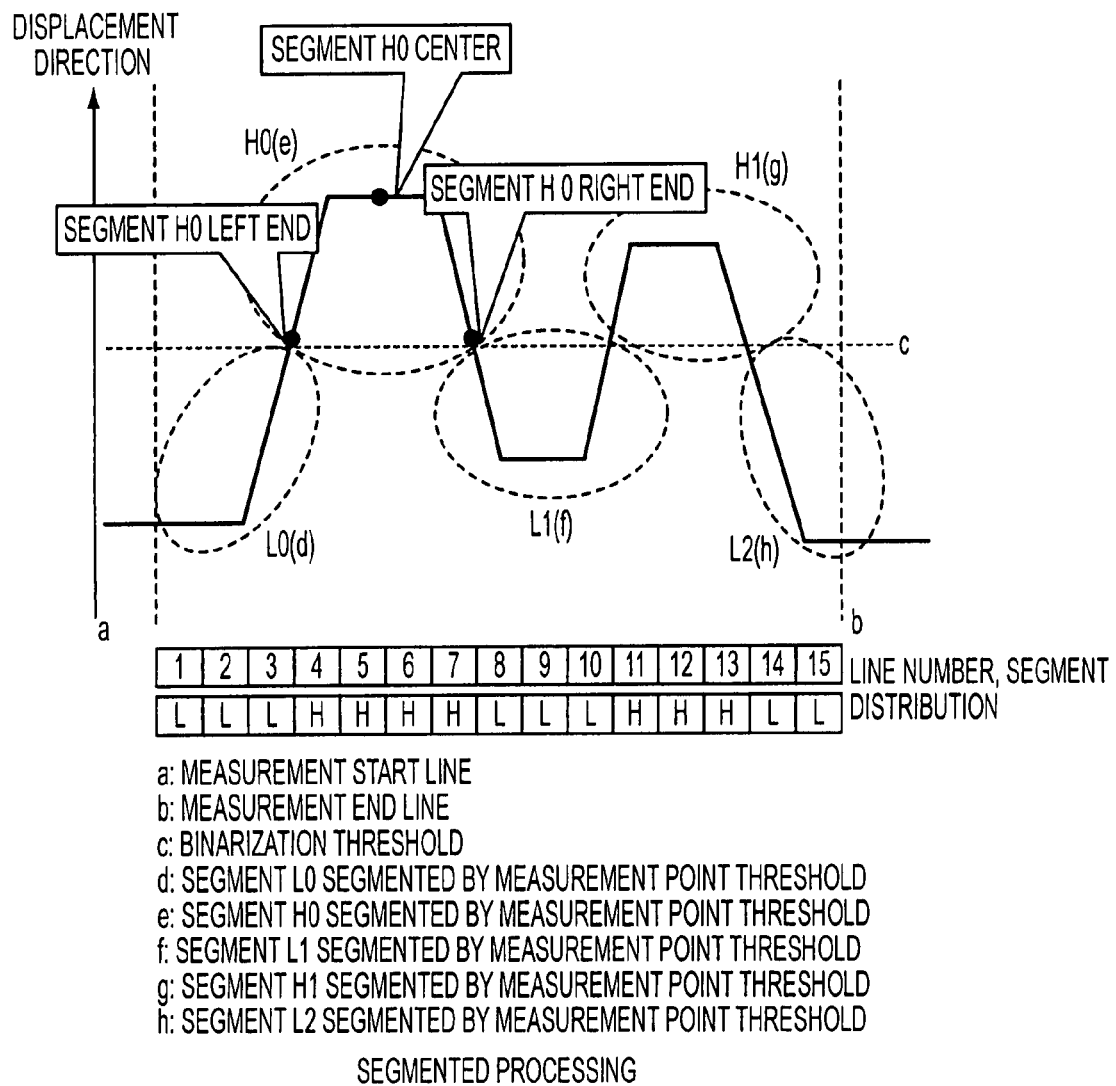
FIG. 19 shows an explanatory view of segmented processing.

The segmented processing will be described with reference to FIG. 19. The segmented processing is a process of segmenting the line beam image in the cutout area according to a given rule. FIG. 19 shows the image in the cutout area of the line beam image, the horizontal direction of FIG. 19 is set to the x-coordinate which corresponds to the direction along the line of the line beam image, and the vertical direction is set to the y-coordinate which corresponds to the direction (displacement direction) which is changed according to the height of the measurement object. In the y-coordinate, the upper side shows the direction where the height of the measurement object is increased. A center value in the y-coordinate direction is calculated in the previously-set cutout area and the center value is set to a binarization threshold (expressed by a line c in FIG. 19). The line beam image of the image to which the teaching is performed is divided into an H segment which is larger than the binarization threshold c and an L segment which is smaller than the binarization threshold c, and grouping is performed such that the H and L segments where the pixels are mutually located within a given distance range are set to a common segment. When the line beam image is thick, the number of target points which becomes the processing target is increased in performing the segmented processing. Therefore, prior to the segmented processing, the thinning process may be performed such that line beam image is converted into the image in which the pixel whose light acceptance amount becomes the highest is extracted in each line of the vertical direction. Through the thinning process, in the example of FIG. 19, the segmentation is performed in each the time the line beam image crosses the line c, and the line beam image is divided into five segments of L0, L1, L2, H0, and H1. Although not shown, when the line beam image constituting the segment H0 is interrupted in the midpoint over a predetermined distance, the process of dividing the segment H0 to recognize the segment H0 as two segments is performed. When the change in width of the vertical direction in the whole of the line beam image is smaller than a predetermined value, or when one of or both the H and L segments do not exist after the segmented processing, the error message is displayed because the subsequent automatic setting is hardly performed to the measurement area or measurement point. In the abnormal case such as the absence of the point to be extracted, in the case where the information on the light acceptance amount possessed by each pixel of the line beam image is smaller than a predetermined value, or in the case where the information on the light acceptance amount is excessively larger than the predetermined value, there is the possibility of wrong measurement due to the influence of the noise or saturation, so that the error message is displayed (Steps 1702 and 1703 of FIG. 17).

After the successful segmented processing, the determination of the set measurement item is made (Step 1704).

In the case where the projected average two-point step measurement or the projected peak two-point step measurement is set, the flow goes to Step 1705. In the case where the recessed average two-point step measurement or the recessed bottom two-point step measurement is set, the flow goes to Step 1706.

In Step 1705, the measurement area is set as follows. The L segment (segment located at the position below the binarization threshold c) located on the leftmost side is extracted as a reference segment based on the result of the segmented processing, and the area of a half length in the horizontal direction (x-coordinate) of the segment is set to the measurement area in the center of the horizontal direction of the reference segment. For the x-coordinate, the center coordinate of the reference segment is also set to the representative point of the measurement area. For the y-coordinate, the coordinate point corresponding to the average coordinate of the y-coordinates of the line beam image located in the measurement area is also set to the representative point of the measurement area. In the case where the projected average two-point step measurement is performed, the H segment (segment located at the position above the binarization threshold c) located on the leftmost side is extracted as the upper-stage segment. As with the reference segment, the measurement area having a half width of the upper-stage segment is set in the center, and the representative point is set. In the case where the projected peak two-point step measurement is performed, the peak coordinate in the upper-stage segment is obtained and set instead of the upper-stage segment. Both the measurement start point which is of the upper left point of the cutout area and the measurement end point which is of the lower right point are also set to the feature point. At this point, in the case where the L segment which becomes the reference segment does not exist, or in the case where the H segment which becomes the upper-stage segment does not exist, the error message is displayed. In this case, it is necessary that the line beam image be set again near the center of the cutout area such that two steps or one reference step and another projected shape are divided into the H segment and the L segment. Therefore, the message is displayed (Steps 1707 and 1708).

Then, the right and left ends of the measurement area of the reference segment (left-side two broken lines in part (d) of FIG. 18(1) and right-side two broken lines in part (f) of FIG. 18(1)) are displayed on the teaching image corresponding to the display of Step 807 of FIG. 9. The right and left ends of the measurement area of the upper-stage segment (right-side two broken lines in part (d) of FIG. 18(1) and left-side two broken lines in part (f) of FIG. 18(1)) and the representative points are displayed in the case of the average two-point step measurement. The peak coordinate is displayed by the cross mark in the case of the peak two-point step measurement. The parts (d) and (f) of FIG. 18(1) show examples of the measurement area and measurement point when the cutout areas are set at (c) and (e) respectively in the projected average two-point step measurement. Each measurement area in the cutout area may be adjusted. The movement input is accepted through the arrow key, and the measurement area may be fixed by pressing the SET key. At this point, relative positions (position in terms of percentage of the total length based on one end in the horizontal direction of the segment) on each segment of the right and left ends in the reference measurement area and upper stage measurement area are set again, and the feature point is calculated and displayed again.

The flow goes to Step 1706 in the case where the recessed average two-point step measurement or the recessed bottom two-point step measurement is set in Step 1704, and the flow goes to Step 1706 in the case where the recessed average two-point step measurement or the recessed bottom two-point step measurement is set in Step 1704.

In Step 1706, the measurement area is set as follows. The H segment (segment located at the position above the binarization threshold c) located on the leftmost side is extracted as the reference segment based on the result of the segmented processing, and the area of a half length in the horizontal direction (x-coordinate) of the segment is set to the measurement area in the center of the horizontal direction of the reference segment. For the x-coordinate, the center coordinate of the reference segment is also set to the representative point of the measurement area. For the y-coordinate, the coordinate point corresponding to the average coordinate of the y-coordinates of the line beam image located in the measurement area is also set to the representative point of the measurement area. In the case where the recessed average two-point step measurement is performed, the L segment (segment located at the position below the binarization threshold c) located on the leftmost side is extracted as the lower-stage segment. As with the reference segment, the measurement area having a half width of the upper-stage segment is set in the center, and the representative point is set. In the case where the recessed bottom two-point step measurement is performed, the bottom coordinate in the lower-stage segment is obtained and set instead of the lower-stage segment. Both the measurement start point which is of the upper left point of the cutout area and the measurement end point which is of the lower right point are also set to the feature point. At this point, in the case where the plural segments are adjacent to the reference segment, because the determination which step is set or which height is set cannot be made, the error message is displayed. In this case, it is necessary that the line beam image be set again such that two steps or one reference step and another projected shape are included in the cutout area. Therefore, the message is displayed (Steps 1707 and 1708).

Then, the right and left ends of the measurement area of the set reference segment (left-side two broken lines in part (d) of FIG. 18(2) and right-side two broken lines in part (f) of FIG. 18(2)) are displayed on the teaching image corresponding to the display of Step 807 of FIG. 9. The right and left ends of the measurement area of the lower-stage segment (right-side two broken lines in part (d) of FIG. 18(2) and left-side two broken lines in part (f) of FIG. 18(2)) and the representative points are displayed in the case of the average two-point step measurement. The bottom coordinate is displayed by the cross mark in the case of the bottom two-point step measurement. The parts (d) and (f) of FIG. 18(2) show examples of the measurement area and measurement point when the cutout areas are set at (c) and (e) respectively in the recessed average two-point step measurement. Each measurement area in the cutout area may be adjusted. The movement input is accepted through the arrow key, and the measurement area may be fixed by pressing the SET key. At this point, the relative positions (position in terms of percentage of the total length based on one end in the horizontal direction of the segment) on each segment of the right and left ends in the reference measurement area and upper stage measurement area are set again, and the feature point is calculated and displayed again.

Figure 20:
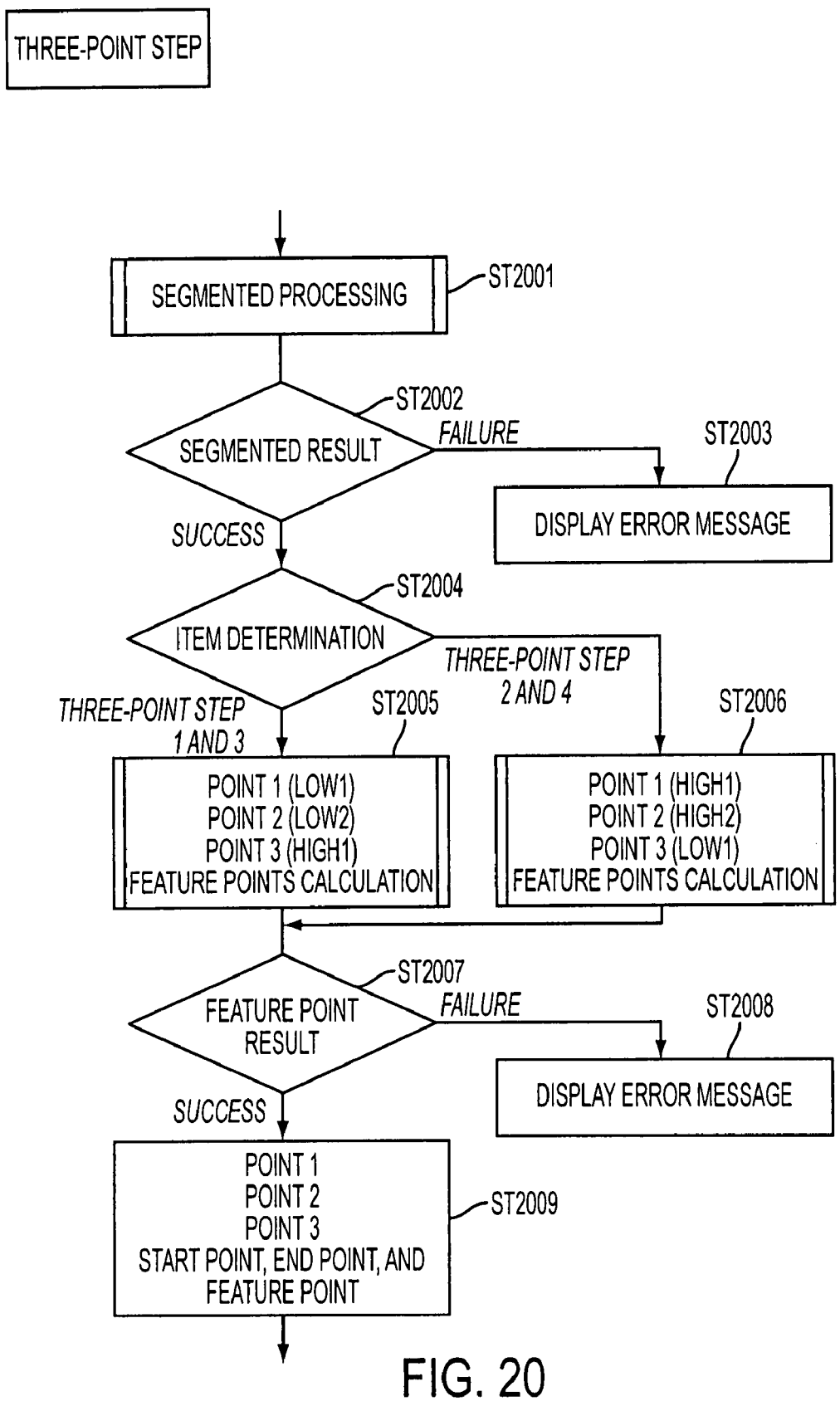
FIG. 20 shows a flowchart of the detailed three-point step measurement.
Figure 21:
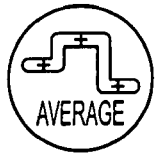
FIG. 21 shows a cutout area and an automatically set measurement area in the three-point step measurement.
Figure 21:
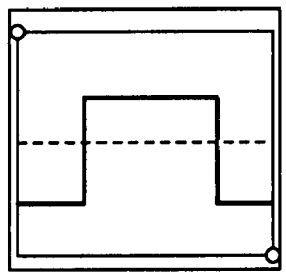
Figure 21:
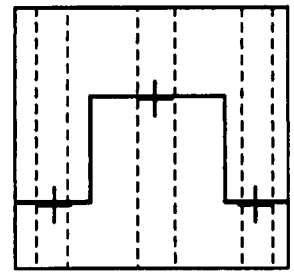
Figure 21:
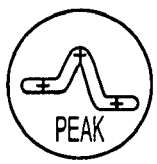
Figure 21:
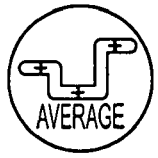
Figure 21:
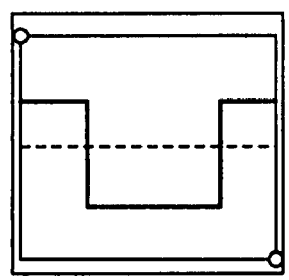
Figure 21:
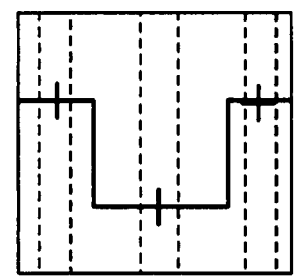
Figure 21:
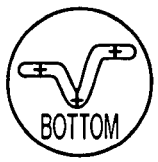

FIGS. 20 and 21 show the process when the three-point step measurement, i.e., one of the projected average three-point step measurement, recessed average three-point step measurement, projected peak three-point step measurement, and recessed bottom three-point step measurement is selected as the measurement item. Referring to FIG. 20, even if any measurement item is selected in the three-point step measurement, the segmented processing is performed as a pre-process commonly used in each measurement (Step 2001).

After the successful segmented processing, the determination of the set measurement item is made (Step 2004).

In the case where the projected average three-point step measurement or the projected peak three-point step measurement is set in Step 2004, the flow goes to Step 2005. In the case where the recessed average two-point step measurement or the recessed bottom two-point step measurement is set in Step 2004, the flow goes to Step 2006.

In Step 2005, the measurement area is set as follows. The L segment (segment located at the position below the binarization threshold c) located on the leftmost side is extracted as the L1 segment based on the result of the segmented processing, and the area of a half length in the horizontal direction (x-coordinate) of the segment is set to the measurement area in the center of the horizontal direction of the L1 segment. For the x-coordinate, the center coordinate of the L1 segment is also set to the representative point of the measurement area. For the y-coordinate, the coordinate point corresponding to the average coordinate of the y-coordinates of the line beam image located in the measurement area is also set to the representative point of the measurement area. In the case where the projected average three-point step measurement is performed, the L segment is extracted as the L2 segment. The L segment is located on the right side of the L1 segment and the H segment is sandwiched between the L segment and the L1 segment. As with the L1 segment, the area having a half length in the horizontal direction (x-coordinate) of the segment is set to the measurement area in the center of the horizontal direction of the L2 segment. For the x-coordinate, the center coordinate of the L2 segment is also set to the representative point of the measurement area. For the y-coordinate, the coordinate point corresponding to the average coordinate of the y-coordinates of the line beam image located in the measurement area is also set to the representative point of the measurement area. Additionally, as with the L1 and L2 segments, in the H segment sandwiched between the L1 segment and the L2 segment, the measurement area having a half width of the upper-stage segment is set in the center, and the representative point is set. In the case where the projected peak three-point step measurement is performed, the peak coordinate in the upper-stage segment is obtained and set instead of the upper-stage segment. Both the measurement start point which is of the upper left point of the cutout area and the measurement end point which is of the lower right point are also set to the feature point. When the H segment does not exist between the L1 segment and the L2 segment, the error message is displayed due to the improper setting of the cutout area (Steps 2007 and 2008).

Then, the right and left ends of each measurement area of the set L1 and L2 segments (left-side two broken lines and right-side two broken lines in part (d) of FIG. 21(1)) are displayed on the teaching image corresponding to the display of Step 807 of FIG. 9. The right and left ends of the measurement area of the upper-stage segment (central two broken lines in part (d) of FIG. 21(1)) and the representative points (cross mark) are displayed in the case of the average three-point step measurement. The peak coordinate of the upper-stage segment is displayed by the cross mark in the case of the peak three-point step measurement. The part (d) of FIG. 21(1) shows examples of the measurement area and measurement point when the cutout area is set at (c) in the projected average three-point step measurement. Each measurement area in the cutout area may be adjusted. The movement input is accepted through the arrow key, and the measurement area may be fixed by pressing the SET key. At this point, the relative positions (position in terms of percentage of the total length based on one end in the horizontal direction of the segment) on each segment of the right and left ends in the reference measurement area and upper stage measurement area are set again, and the feature point is calculated and displayed again.

In Step 2006, the measurement area is set as follows. The H segment (segment located at the position above the binarization threshold c) located on the leftmost side is extracted as the H1 segment based on the result of the segment processing, and the area of a half length in the horizontal direction (x-coordinate) of the segment is set to the measurement area in the center of the horizontal direction of the H1 segment. For the x-coordinate, the center coordinate of the H1 segment is also set to the representative point of the measurement area. For the y-coordinate, the coordinate point corresponding to the average coordinate of the y-coordinates of the line beam image located in the measurement area is also set to the representative point of the measurement area. In the case where the recessed average three-point step measurement is performed, the H segment is extracted as the H2 segment. The H segment is located on the right side of the H1 segment, and the L segment is sandwiched between the H segment and H1 segment. As with the H1 segment, the area of a half length in the horizontal direction (x-coordinate) of the segment is set to the measurement area in the center of the horizontal direction of the H2 segment. For the x-coordinate, the center coordinate of the H2 segment is also set to the representative point of the measurement area. For the y-coordinate, the coordinate point corresponding to the average coordinate of the y-coordinates of the line beam image located in the measurement area is also set to the representative point of the measurement area. Additionally, as with the H1 and H2 segments, in the L segment sandwiched between the H1 segment and the H2 segment, the measurement area having a half width of the lower-stage segment is set in the center, and the representative point is set. In the case where the recessed bottom three-point step measurement is performed, the bottom coordinate in the lower-stage segment is obtained instead of the representative point of the lower-stage segment. Both the measurement start point which is of the upper left point of the cutout area and the measurement end point which is of the lower right point are also set to the feature point. When the L segment does not exist between the H1 segment and the H2 segment, the error message is displayed due to the improper setting of the cutout area (Steps 2007 and 2008).

Then, the right and left ends of each measurement area of the set H1 and H2 segments (left-side two broken lines and right-side two broken lines in part (d) of FIG. 21(2)) are displayed on the teaching image corresponding to the display of Step 807 of FIG. 9. The right and left ends of the measurement area of the upper-stage segment (central two broken lines in part (d) of FIG. 21(2)) and the representative points (cross mark) are displayed in the case of the average three-point step measurement. The peak coordinate of the upper-stage segment is displayed by the cross mark in the case of the bottom three-point step measurement. The part (d) of FIG. 21(2) shows examples of the measurement area and measurement point when the cutout area is set at (c) in the recessed average three-point step measurement. Each measurement area in the cutout area may be adjusted. The movement input is accepted through the arrow key, and the measurement area may be fixed by pressing the SET key. At this point, the relative positions (position in terms of percentage of the total length based on one end in the horizontal direction of the segment) on each segment of the right and left ends in the reference measurement area and upper stage measurement area are set again, and the feature point is calculated and displayed again.

Figure 22:
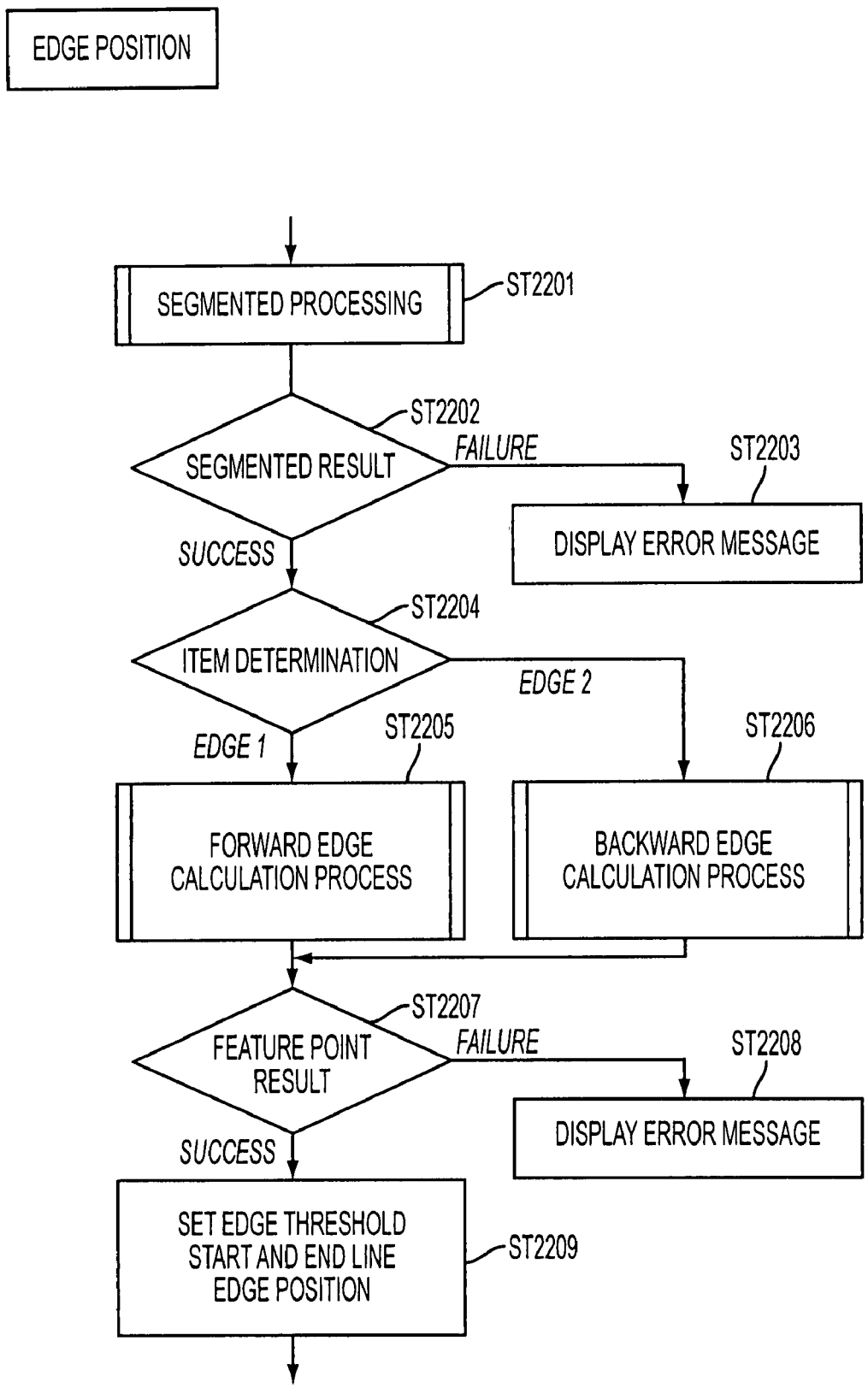
FIG. 22 shows a flowchart of detailed edge position measurement.
Figure 23:
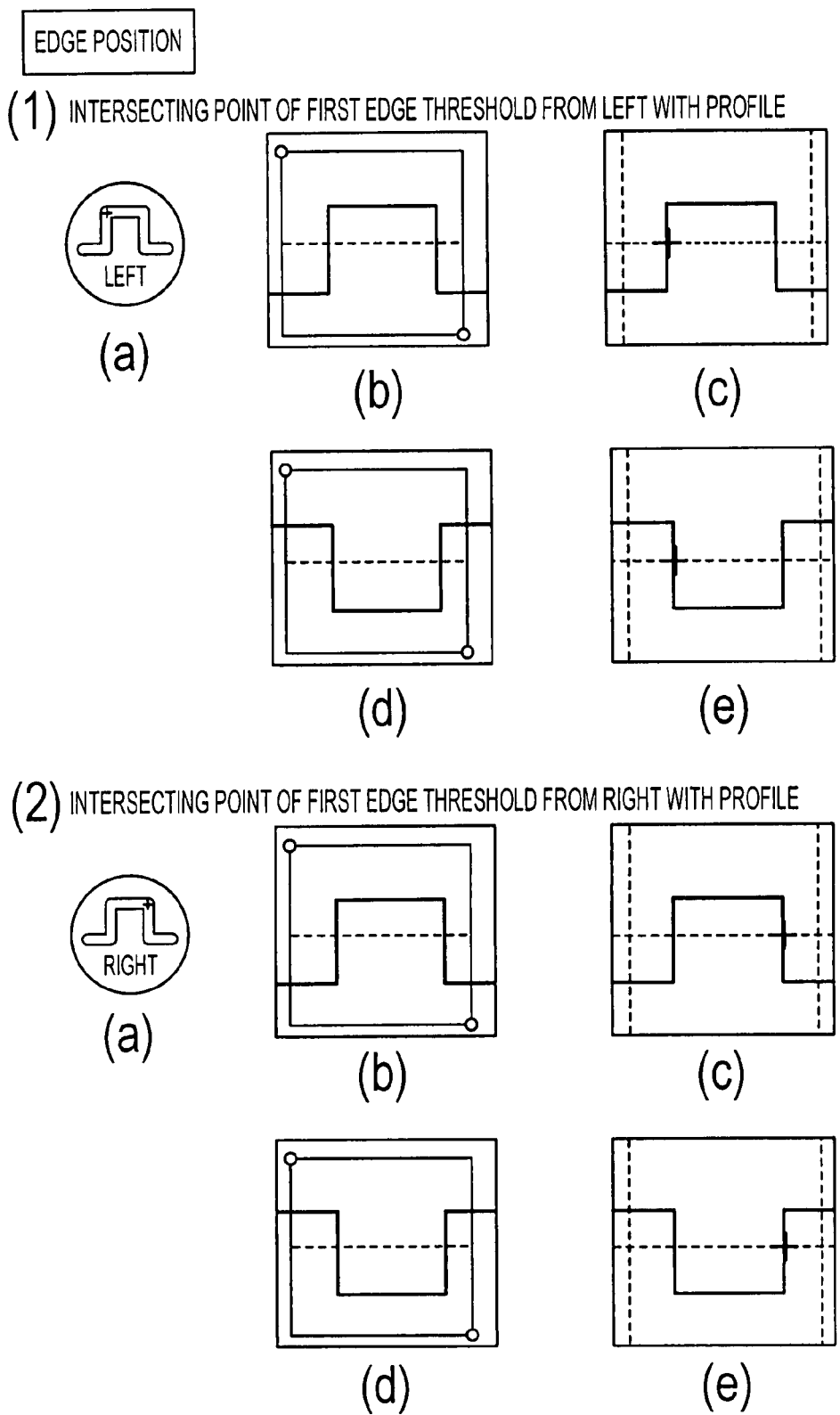
FIG. 23 shows a cutout area and an automatically set measurement area in the edge position measurement.

FIGS. 22 and 23 show the process when the edge position measurement, i.e., one of the left edge position measurement and the edge position measurement is selected as the measurement item. Referring to FIG. 22, even if any measurement item is selected in the edge position measurement, the segmented processing is performed as a pre-process commonly used in each measurement (Step 2201).

In the case of the false segmented processing, the error message is displayed (Steps 2202 and 2203). In the case of the successful segmented processing, the determination of the set measurement item is made (Step 2204). The flow goes to Step 2205 in the case of the left edge position measurement, and the flow goes to Step 2206 in the case of the right edge position measurement.

In Step 2205, the second segment from the left is extracted, and the coordinate at the left end of the extracted segment is set to the left edge coordinate. When the first and second segments from the left are not obtained while a distance between the first and second segments in the vertical direction is not lower than a predetermined value, there is a possibility of wrong measurement, so that the error message is displayed (Steps 2207 and 2208).

Then, the teaching image, the line indicating the positions at right and left ends of the x-coordinate of the cutout area, and the obtained edge coordinate point are displayed corresponding to the display of Step 807 of FIG. 9 while overlapping one another (parts (c) and (e) in FIG. 23(1)). The binarization threshold of the cutout area is displayed as the edge threshold. Part (c) of FIG. 23 (1) shows a display image when the cutout area is set in the line beam image shown in part (b) of FIG. 23 (1). Part (e) of FIG. 23 (1) shows a display image when the cutout area is set in the line beam image shown in part (d) of FIG. 23 (1). The cutout area and the edge threshold may be adjusted. The movement input of the broken line is accepted through the arrow key, and the measurement area may be fixed by pressing the SET key. In this case, the edge threshold reset in the cutout area after the setting is changed is set to the binarization threshold again, and the segmented processing is performed based on the binarization threshold to set and display the edge coordinate again.

In Step 2206, the second segment from the right is extracted, and the coordinate at the right end of the extracted segment is set to the left edge coordinate. When the first and second segments from the right are not obtained while a distance between the first and second segments in the height (y-coordinate) direction is not lower than a predetermined value, the error message is displayed (Steps 2207 and 2208).

Then, the teaching image, the line indicating the positions at right and left ends of the x-coordinate of the cutout area, and the obtained edge coordinate point are displayed corresponding to the display of Step 807 of FIG. 9 while overlapping one another (parts (c) and (e) in FIG. 23(2)). The binarization threshold of the cutout area is displayed as the edge threshold. Part (c) of FIG. 23 (2) shows a display image when the cutout area is set in the line beam image shown in part (b) of FIG. 23 (2). Part (e) of FIG. 23 (2) shows a display image when the cutout area is set in the line beam image shown in part (d) of FIG. 23 (2). The cutout area and the edge threshold may be adjusted. The movement input of the broken line is accepted through the arrow key, and the measurement area may be fixed by pressing the SET key. In this case, the edge threshold reset in the cutout area after the setting is changed is set to the binarization threshold again, and the segmented processing is performed based on the binarization threshold to set and display the edge point again.

The left edge and the right edge can be extracted in principle by the right end coordinate of the first segment from the left and the left end coordinate of the first segment from the right. However, because the measurement object is illuminated with the line beam from above to perform the measurement by the principle of triangulation, the line beam image located at the lower position (small y-coordinate) possibly includes a dead angle, and sometimes irregular reflection occurs to generate an error in the recess. Therefore, the edge position is calculated using the high-reliability image located at the higher position in the vertical direction (y-coordinate).

Figure 24:
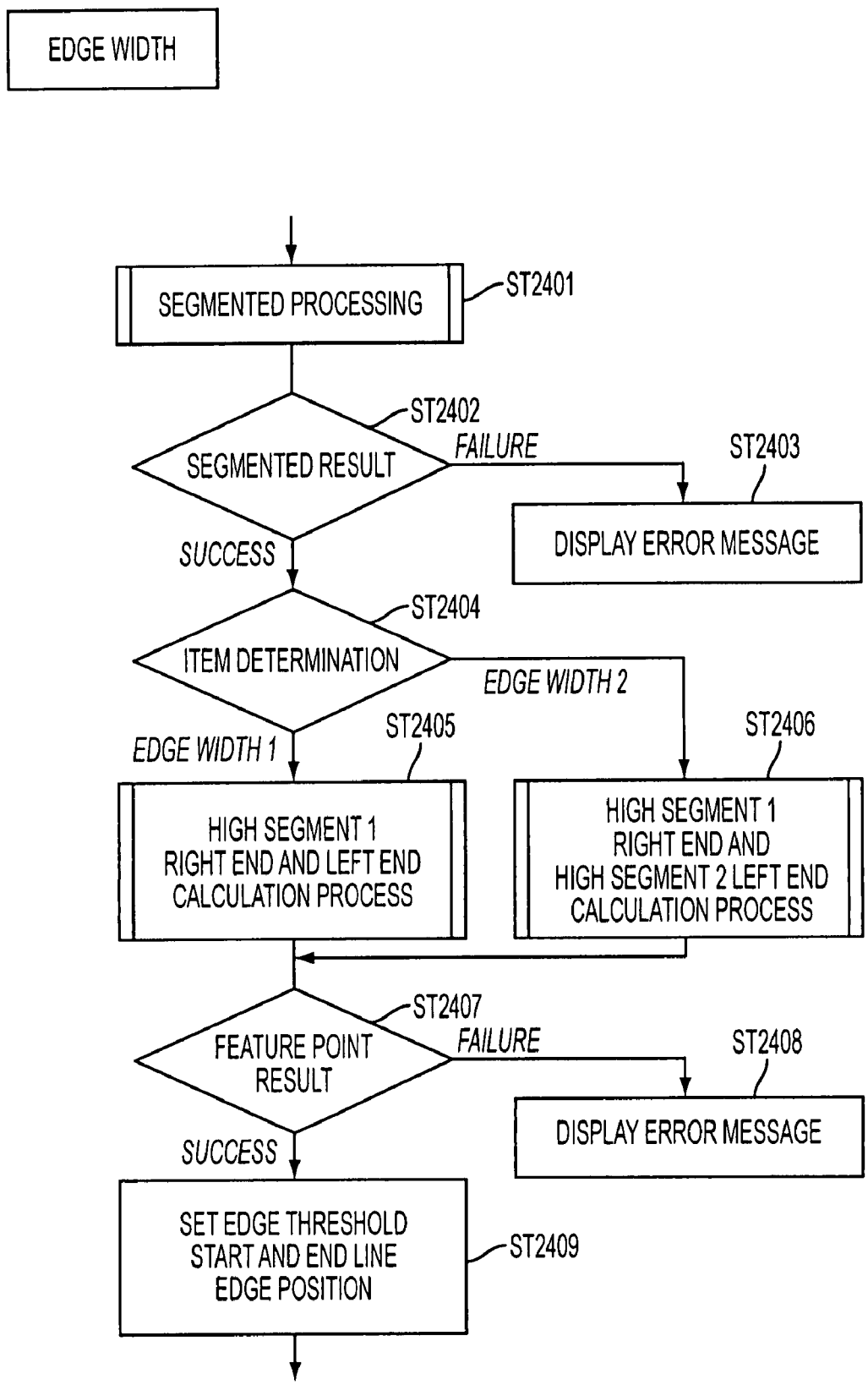
FIG. 24 shows a flowchart of detailed edge width measurement.
Figure 25:
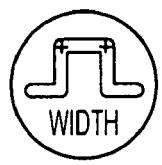
FIG. 25 shows a cutout area and an automatically set measurement area in the edge width measurement.
Figure 25:
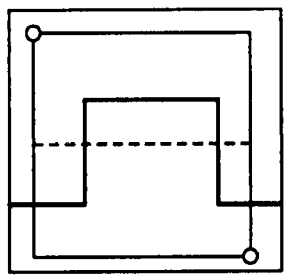
Figure 25:
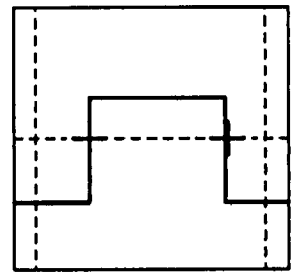
Figure 25:
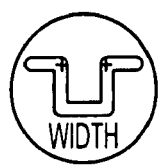
Figure 25:
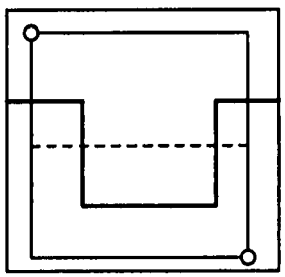
Figure 25:
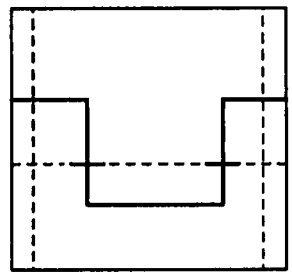

FIGS. 24 and 25 show the process when the edge width measurement, i.e., one of the projected upper surface edge width measurement and the recessed upper surface edge width measurement is selected as the measurement item. Referring to FIG. 24, even if any measurement item is selected in the edge position measurement, the segmented processing is performed as a pre-process commonly used in each measurement (Step 2401).

In the case of the false segmented processing, the error message is displayed (Steps 2402 and 2403). In the case of the successful segmented processing, the determination of the set measurement item is made (Step 2404). The flow goes to Step 2405 in the case of the projected upper surface edge width measurement, and the flow goes to Step 2406 in the case of the recessed upper surface edge width measurement.

In Step 2405, the H segment located on the leftmost side is extracted, and the coordinates at the right and left ends of the H segment is set to the left edge coordinate and right edge coordinate of the projected upper surface edge width respectively. When the L segments do not exist on both sides of the H segment, there is a possibility of wrongly measuring the projected upper surface edge width, so that the error message is displayed (Steps 2407 and 2408).

Then, the teaching image, the line indicating the positions at right and left ends of the x-coordinate of the cutout area, and the obtained left edge coordinate and right edge coordinate of the projected upper surface edge width are displayed corresponding to the display of Step 807 of FIG. 9 while overlapping one another (FIG. 25C). The binarization threshold of the cutout area is displayed as the edge threshold. FIG. 25C shows a display image when the cutout area is set in the line beam image shown FIG. 25B. The cutout area and the edge threshold may be adjusted. The movement input of the broken line is accepted through the arrow key, and the measurement area may be fixed by pressing the SET key. In this case, the edge threshold reset in the cutout area after the setting is changed is set to the binarization threshold again, and the segmented processing is performed based on the binarization threshold to set and display the edge coordinate again.

In Step 2406, the H segment (referred to as H1 segment) located on the leftmost side and the second H segment from the left (referred to as H2 segment) are extracted, and the coordinate at the right end of the H1 segment and the coordinate at the left end of the H2 segment are set to the left edge coordinate and right edge coordinate of the recessed upper surface edge width respectively. When the L segment does not exist between the, there is a possibility of wrongly measuring the recessed upper surface edge width, so that the error message is displayed (Steps 2407 and 2408).

Then, the teaching image, the line indicating the positions at the right and left ends of the x-coordinate of the cutout area, and the obtained left edge coordinate and right edge coordinate of the recessed upper surface edge width are displayed corresponding to the display of Step 807 of FIG. 9 while overlapping one another (FIG. 25F). The binarization threshold of the cutout area is displayed as the edge threshold. FIG. 25F shows a display image when the cutout area is set in the line beam image shown in FIG. 25E. The cutout area and the edge threshold may be adjusted. The movement input of the broken line is accepted through the arrow key, and the measurement area may be fixed by pressing the SET key. In this case, the edge threshold reset in the cutout area after the setting is changed is set to the binarization threshold again, and the segmented processing is performed based on the binarization threshold to set and display the edge point again.

In each of the edge width measurements, the edge coordinate is calculated based on the upper surface. Because the measurement object is illuminated with the line beam from above to perform the measurement by the principle of triangulation, the line beam image located at the lower position (small y-coordinate) possibly includes the dead angle, and sometimes irregular reflection occurs to generate an error in the recess. Accordingly, the edge position is calculated using the high-reliability image located at the higher position in the vertical direction (y-coordinate).

Thus, the setting is completed when the FUN mode is selected, and the setting result is displayed on the screen. Then, the flow returns to Step 802 of FIG. 8, and the processes in the FUN mode are repeated unless the mode switch 707 is switched. When the mode switch 707 is switched to the ADJ mode or the RUN mode, the processes are performed according to the ADJ mode or the RUN mode.

When the ADJ mode is selected by the mode switch 707, the setting and adjustment of the threshold for determining whether the measurement result used in RUN mode is acceptable or defective are displayed, and the inputs for the setting and adjustment of the threshold are accepted. The measurement value and the threshold are displayed on the screen for the currently selected measurement mode. The displayed threshold is increased or decreased by the input of the vertical keys of the arrow key 709. When the SET key 711 is pressed, the threshold at that time is set to the threshold for making the determination in the RUN mode. In the threshold, the actual distance is displayed in a unit of millimeter to accept the setting. A process of converting the distance into the coordinate value is performed in the displacement sensor. The height is set to the threshold in the case of the height measurement, and the height of the step is set to the threshold in the case of the two-point step measurement and three-point step measurement. In the case of the edge position, the threshold is the horizontal position (x-coordinate) on the screen, and the threshold coordinate is set for the coordinate in the direction along the line beam on the measurement object. In the edge interval, the threshold is the horizontal position (x-coordinate) on the screen, and the distance between the two edges is set for the coordinate in the direction along the line beam on the measurement object.

When the RUN mode is selected by the mode switch 707, the measurement process is performed according to the set measurement item from the measurement area or measurement point already set in the FUN mode, the determination whether the obtained measurement value is acceptable or defective is made based on the threshold set in the ADJ mode. Then, the determination result is displayed on the screen, and the determination result is output to the outside through the output unit 108. The measurement value, the determination result, and data on the screen can also be outputted through the USB communication unit 105a, the serial communication unit 105b, and the inter-signal processing unit communication unit 105c.

Figure 26:
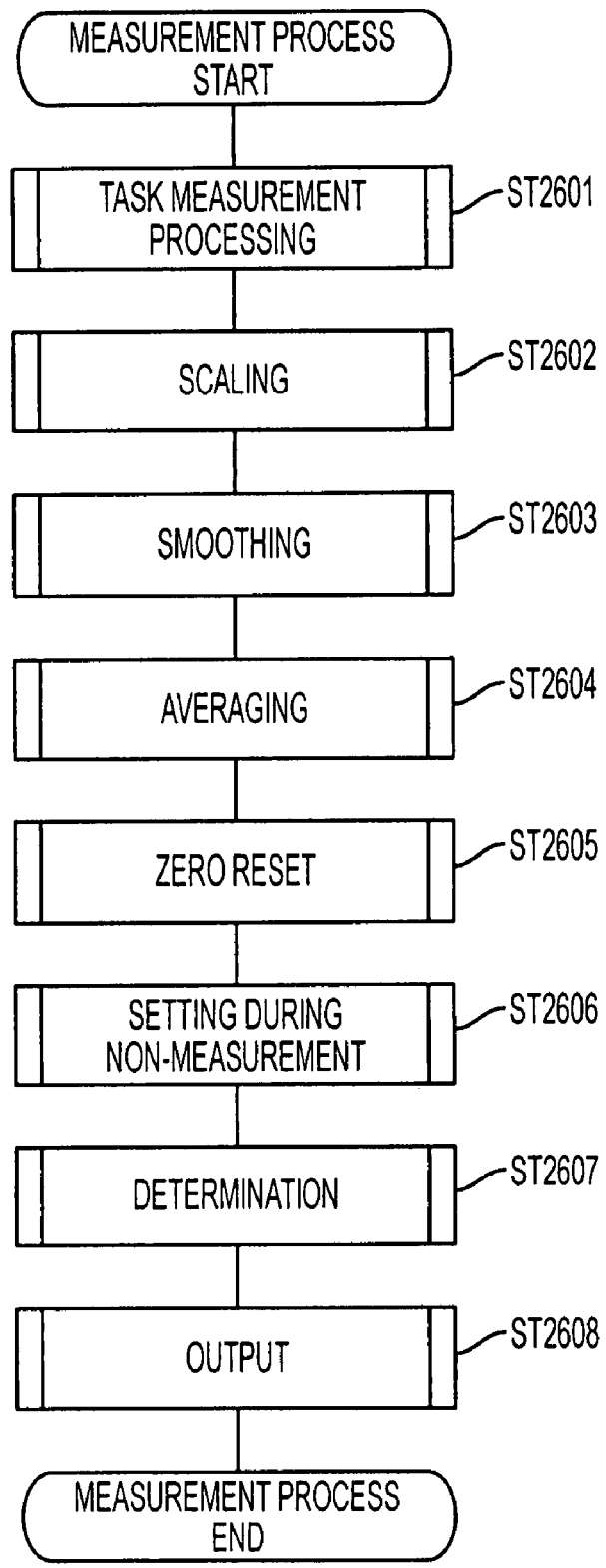
FIG. 26 shows a flowchart of a detailed RUN mode.

FIG. 26 shows the detailed process in the RUN mode. The measurement process is performed by interrupt processing. In the case of the external trigger measurement, the measurement is performed by the input of an external trigger. In the case of the repeated measurement, the measurement is started by periodically generating a measurement start trigger by itself (Step 2601).

In Step 2602, the measurement is performed using the measurement area or measurement point (feature point) according to the set measurement item.

In the case of the height measurement, the line beam image is obtained. Then, the average y-coordinate value is calculated for the line beam image in the set cutout area when the average measurement is performed, the y-coordinate value of the peak coordinate is calculated for the line beam image in the set cutout area for the line beam image in the set cutout area when the peak measurement is performed, or the y-coordinate value of the bottom coordinate is calculated for the line beam image in the set cutout area when the bottom measurement is performed (Step 2601). Then, the calculated value is converted into millimeter which is of the real space unit (Step 2602). A smoothing process of removing the value which is separated away from the past values by a predetermined value or more as an abnormal value is performed (Step 2603), and a previously-set average value of the values obtained in the predetermined number of times is calculated based on the predetermined average value of the number of times (Step 2604). In the case where zero reset is set, the value which is set so as to be displayed as zero is subtracted from the average result value (Step 2605). During the process, when the error is generated as shown in the setting process, the error message is displayed and the previous value is retained. When the error is not generated, the calculated value is compared to the threshold, and the determination result is outputted (Steps 2607 and 2608). Then, the flow is ended.

In the case of the two-point step measurement, the line beam image is obtained, and the value in which the average value of the y-coordinates of the measurement area of the set reference segment is subtracted from the average value of the y-coordinates of the measurement area of the set upper-stage segment is calculated for the line beam image in the set cutout area when the projected average two-point step measurement is performed. The value in which the average value of the y-coordinates of the measurement area of the set reference segment is subtracted from the y-coordinate of the peak coordinate of the set upper-stage segment is calculated in the case of the projected peak two-point step measurement. The value in which the average value of the y-coordinates of the measurement area of the set lower-stage segment is subtracted from the average value of the y-coordinates of the measurement area of the set reference segment is calculated in the case of the recessed average two-point step measurement. The value in which the y-coordinate of the set recessed bottom coordinate is subtracted from the average value of the y-coordinates of the measurement area of the set reference segment is calculated in the case of the recessed bottom two-point step measurement (Step 2601). The calculated value is converted into millimeter which is of the real space unit (Step 2602). Then, the smoothing process of removing the value which is separated away from the past values by a predetermined value or more as the abnormal value is performed (Step 2603), and the previously-set average value of the values obtained in the predetermined number of times is calculated based on the predetermined average value of the number of times (Step 2604). In the case where zero reset is set, the value which is set so as to be displayed as zero is subtracted from the average result value (Step 2605). During the process, when the error is generated as shown in the setting process, the error message is displayed and the previous value is retained. When the error is not generated, the calculated value is compared to the threshold, and the determination result is outputted (Steps 2607 and 2608). Then, the flow is ended.

In the case of the three-point step measurement, the line beam image is obtained, and the value in which the average value of the y-coordinates of the measurement area of the set L1 segment and L2 segment is subtracted from the average value of the y-coordinate of the measurement area of the set upper-stage segment is calculated for the line beam image in the set cutout area when the projected average three-point step measurement is performed. The value in which the average value of the y-coordinates of the measurement area of the set L1 segment and L2 segment is subtracted from the y-coordinate of the peak coordinate of the set upper-stage segment is calculated in the case of the projected peak three-point step measurement. The value in which the average value of the y-coordinates of the measurement area of the set lower-stage segment is subtracted from the average value of the y-coordinates of the measurement area of the set H1 segment and H2 segment is calculated in the case of the recessed average three-point step measurement. The value in which the y-coordinate value of the bottom coordinate of the set lower-stage segment is subtracted from the average value of the y-coordinates of the measurement area of the set H1 segment and H2 segment is calculated in the case of the recessed bottom three-point step measurement. The calculated value is converted into millimeter which is of the real space unit (Step 2602). Then, the smoothing process of removing the value which is separated away from the past values by a predetermined value or more as the abnormal value is performed (Step 2603), and the previously-set average value of the values obtained in the predetermined number of times is calculated based on the predetermined average value of the number of times (Step 2604). In the case where zero reset is set, the value which is set so as to be displayed as zero is subtracted from the average result value (Step 2605). During the process, when the error is generated as shown in the setting process, the error message is displayed and the previous value is retained. When the error is not generated, the calculated value is compared to the threshold, and the determination result is outputted (Steps 2607 and 2608). Then, the flow is ended.

In the case of the edge position measurement, the line beam image is obtained. Then, the x-coordinate of the coordinate at the left end of the second segment from the left is calculated for the line beam image in the set cutout area when the left edge position measurement is performed, or the x-coordinate of the coordinate at the right end of the second segment from the right is calculated for the line beam image in the set cutout area when the right edge position measurement is performed (Step 2601). The calculated value is converted into millimeter which is of the real space unit (Step 2602). Then, the smoothing process of removing the value which is separated away from the past values by a predetermined value or more as the abnormal value is performed (Step 2603), and the previously-set average value of the values obtained in the predetermined number of times is calculated based on the predetermined average value of the number of times (Step 2604). In the case where zero reset is set, the value which is set so as to be displayed as zero is subtracted from the average result value (Step 2605). During the process, when the error is generated as shown in the setting process, the error message is displayed and the previous value is retained. When the error is not generated, the calculated value is compared to the threshold, and the determination result is outputted (Steps 2607 and 2608). Then, the flow is ended.

In the case of the edge width measurement, the line beam image is obtained. Then, the x-coordinates of the coordinates at the right and left ends of the H segment located on the leftmost side are calculated for the line beam image in the set cutout area when the projected upper surface edge width measurement is performed. In the case of the recessed upper surface edge width measurement, the x-coordinate of the coordinate at the right end of the H segment located on the leftmost side and the x-coordinate of the coordinate at the left end of the second H segment from the left are calculated, and the interval between the x-coordinates is calculated (Step 2602). The calculated value is converted into millimeter which is of the real space unit (Step 2602). Then, the smoothing process of removing the value which is separated away from the past values by a predetermined value or more as the abnormal value is performed (Step 2603), and the previously-set average value of the values obtained in the predetermined number of times is calculated based on the predetermined average value of the number of times (Step 2604). In the case where zero reset is set, the value which is set so as to be displayed as zero is subtracted from the average result value (Step 2605). During the process, when the error is generated as shown in the setting process, the error message is displayed and the previous value is retained. When the error is not generated, the calculated value is compared to the threshold, and the determination result is outputted (Steps 2607 and 2608). Then, the flow is ended.

As described above, according to the displacement sensor of the embodiment, the setting for the desired measurement can be performed by the simple operation.

What is claimed is:

1. A displacement sensor comprising:
    a floodlighting unit which illuminates a measurement object with a line beam;
    an imaging unit which takes an image of the line beam on an imaging unit light acceptance surface, wherein a position of the image of the line beam on the light acceptance surface changes according to a height of a surface of the measurement object illuminated with the line beam;
    a processing unit which obtains a height distribution in relation to a direction along the line beam on the surface of the measurement object based on the taken image including the line beam image obtained from the imaging unit, performs a measurement process previously set based on a plurality of local regions or feature points on the obtained height distribution in relation to the direction along the line beam, and performs a setting process for setting a content of the measurement process;
    a display unit which displays the taken image and a screen for the setting;
    an input unit which receives an input for performing the setting; and
    an output unit which outputs a result of the measurement process,
    wherein, in the setting process, the processing unit displays the taken image on the display unit, and sets the taken image as a setting object image, the taken image being displayed on the display unit when a confirmation instruction is inputted through the input unit,
    in the measurement process for the setting object image, the processing unit simultaneously displays an option in which measurement is performed based on, as a reference line or a reference point, a line or a point relatively located in an upper portion of the line beam image included in the setting object image and an option in which measurement is performed based on, as a reference line or a reference point, a line or a point relatively located in a lower portion of the line beam image, or simultaneously displays an option in which measurement is performed based on, as a reference line or a reference point, a line or a point relatively located on a left side of the line beam image included in the setting object image or an option in which measurement is performed based on, as a reference line or a reference point, a line or a point relatively located on a right side of the line beam image, receives an option selection input through the input unit, and sets a kind of the measurement process to be set while the reference line or reference point for the measurement process is distinguished from others, the processing unit sets one measurement process target region in the setting object image, the one measurement process target region becoming a target of the measurement process, and the processing unit automatically sets a local region or a feature point according to a relative positional relationship between the line beam image and the set reference line or reference point, the local region or feature point being necessary to perform the set measurement process to the line beam image included in the one measurement process target region.

2. The displacement sensor according to claim 1, wherein the processing unit displays the setting object image on the display unit in the process of setting the measurement process target region, the processing unit displays a candidate region for the measurement process target region while the candidate region is overlapped with the setting object image, the processing unit receives an instruction to change a position, a shape, and a size of the candidate region through the input unit, and updates and displays the position, the shape, and the size of the candidate region when receiving the change instruction, and the processing unit receives an instruction input for confirming a measurement process target region through the input unit, and sets the candidate region at that time as the measurement target region.

3. The displacement sensor according to claim 1, wherein the processing unit automatically sets a local region used in the set measurement process or a feature point used in the measurement process, and displays the local region or the feature point while the local region or the feature point is overlapped with the setting object image.

4. The displacement sensor according to claim 3, wherein the processing unit displays the local region or the feature point, and receives a change in range of the local region or a change in setting of a parameter used to calculate the feature point, and when the processing unit receives the change input, the processing unit displays the feature point calculated based on the post-change local region or post-change parameter, receives an instruction input for confirming the local region or the parameter used to calculate the feature point through the input unit, and sets the local region or the parameter used to calculate the feature point at that time as the local region or the parameter used to calculate the feature point which is to be used in the measurement process.

5. The displacement sensor according to claim 1, wherein the processing unit simultaneously displays peak height measurement for a reference height and bottom depth measurement for a reference height as measurement process options to receive selection of the option.

6. The displacement sensor according to claim 1, wherein, in the measurement process, the processing unit simultaneously displays an option of measuring a step height up to an upper stage with respect to a reference height and an option of measuring a step depth down to a lower stage with respect to the reference height on the screen to receive selection of the option.

7. The displacement sensor according to claim 1, wherein, in the measurement process, the processing unit simultaneously displays an option of measuring an edge position of a left-side step and an option of measuring an edge position of a right-side step on the screen to receive selection of the option.

8. The displacement sensor according to claim 1, wherein in the measurement process, the processing unit simultaneously displays an option of measuring an interval between a left-side edge and a right-side edge of a projected upper stage and an option of measuring an interval between a right-side edge of a recessed left-side upper stage and a left-side edge of a right-side upper stage on the screen to receive selection of the option.

9. The displacement sensor according to claim 5, wherein, in the option of the measurement process, the processing unit displays a projected icon described on a reference line existing in a lower portion for the measurement of peak height for the reference height, and displays a projected icon described below the reference line existing in an upper portion for the measurement of bottom depth for the reference height.

10. The displacement sensor according to claim 6, wherein, in the option of the measurement process, the processing unit displays an icon in which a line existing in an upper portion and other two lines are described for the measurement of step height up to the upper stage with respect to the reference height, the two lines being located on both sides of and below the line existing in the upper portion at the same height, and the processing unit displays an icon in which a line existing in a lower portion and other two lines are described for the measurement of step depth down to the lower stage with respect to the reference height, the two line being located on both sides of and above the line existing in the lower portion at the same height.

11. The displacement sensor according to claim 7, wherein, in the option of the measurement process, the processing unit displays an icon including a drawing for the left-side edge measurement, the drawing including a plurality of edges which are boundary portions of the step, a leftmost edge being displayed while distinguished from the other portions in the drawing, and the processing unit displays an icon including a drawing for the edge position measurement of the right-side step, the drawing including a plurality of edges which are boundary portions of the step, a rightmost edge being displayed while distinguished from the other portions in the drawing.

12. The displacement sensor according to claim 8, wherein, in the option of the measurement process, the processing unit displays an icon indicating the left-side edge of the projected upper line and the right-side edge of the projected upper line for the measurement of the interval between the left-side edge and the right-side edge of the projected upper stage, and the processing unit displays an icon indicating positions of the right-side edge of the recessed left-side upper stage and the left-side edge of the right-side upper stage for the measurement of the interval between the right-side edge of the recessed left-side upper stage and the left-side edge of the right-side upper stage.

13. The displacement sensor according to claim 9, wherein the processing unit displays the icon to receive selection of the option inputted through the input unit, and sets a kind of the measurement process while the reference line or reference point for the measurement process is distinguished from others, in the process of setting the measurement process target region, the processing unit displays the setting object image on the display unit, and displays a candidate region for the measurement process target region while the candidate region is overlapped with the setting object image, the processing unit receives an instruction to change a position, a shape, and a size of the candidate region through the input unit, and updates and displays the changed position, shape, and size of the candidate region when receiving the change instruction, and the processing unit receives an instruction input for confirming the measurement process target region through the input unit, and sets the candidate region at that time as the measurement target region.

* * * * *